(12) United States Patent
Jamalabad et al.

(10) Patent No.: US 6,823,230 B1
(45) Date of Patent: Nov. 23, 2004

(54) TOOL PATH PLANNING PROCESS FOR COMPONENT BY LAYERED MANUFACTURE

(75) Inventors: Vikram R. Jamalabad, Somerville, NJ (US); Jeffrey A. Chard, Madison, WI (US); Charles J. Gasdaska, Sparta, NJ (US)

(73) Assignee: Honeywell International Inc., Morristown, NJ (US)

(*) Notice: Subject to any disclaimer, the term of this patent is extended or adjusted under 35 U.S.C. 154(b) by 856 days.

(21) Appl. No.: 09/657,134

(22) Filed: Sep. 7, 2000

(51) Int. Cl.[7] .............................. G06F 19/00; B28B 3/10
(52) U.S. Cl. ........................ 700/119; 700/182; 264/308
(58) Field of Search ................................ 700/119, 182, 700/120

(56) References Cited

U.S. PATENT DOCUMENTS

| 4,408,754 A | 10/1983 | Meier ........................... 270/52 |
| 4,706,200 A | 11/1987 | Kishi et al. .................. 700/187 |

(List continued on next page.)

FOREIGN PATENT DOCUMENTS

| GB | 2 043 957 | 10/1980 |

OTHER PUBLICATIONS

Wayne Tiller et al., "Offsets of Two–Dimensional Profiles", IEEE Computer Graphics and Applications, vol. 4, No. 9, Sep. 1984, pp. 36–46.

Martin Held, "A geometry–based investigation of the tool path generation for zigzag pocket machining", *The Visual Computer, International Journal of Computer Graphics*, vol. 7, Nos. 5–6, 1991, pp. 296–308.

Saif E.O. Saeed et al., "An Efficient 2D Solid Offsetting Algorithm", Geometric Modeling Project, Department of Mechanical Engineering, The University of Leeds, Leeds, LS2 9JT, England, dated prior to Sep. 7, 2000.

R. van Weeren et al., "Quality of Parts Processed by Fused Deposition", Solid Freeform Fabrication Proceedings, Sep. 1995, pp. 314–325.

Vikram J. Jamalabad et al., "Topology Driven Improvement of FDC Build Parameters", Soid Freeform Fabrication Symposium 1998, proceedings Aug. 10–12, 1998, The University of Texas at Austin, pp. 319–326.

(List continued on next page.)

*Primary Examiner*—Albert W. Paladini
*Assistant Examiner*—Sheela S Rao
(74) *Attorney, Agent, or Firm*—Kris T. Fredrick

(57) ABSTRACT

Methods for improving the manufacture of objects made by layered manufacturing techniques through improved tool path generation. A vertex improvement aspect improves tool paths used to form vertices. Outer perimeter vertices can be improved by automatically creating an outer boundary reflecting the design intent to have material extending to the perimeter vertex. The outer boundary can be used as a contour tool path or as a limit to travel by raster tool paths. Boundary vertices within parts can be improved by extending more internal boundary vertices outward toward enclosing vertices, thereby eliminating some internal voids. Contour boundaries near outer perimeter corners can be better defined by extending outward a contour tool path toward the corners. Narrow regions between combinations of outer and/or inner perimeters can be filled through improved tool paths. Layer regions near inner voids can receive consistent filling through an improved raster tool path method. Sub-perimeter voids between raster bead pair turn-arounds and contour beads can be eliminated by automatically adjusting the raster tool path vertices toward the adjacent raster bead pair and/or contour bead.

63 Claims, 19 Drawing Sheets

U.S. PATENT DOCUMENTS

| | | | |
|---|---|---|---|
| 4,907,164 A | 3/1990 | Guyder | 700/173 |
| 4,914,599 A | 4/1990 | Seki et al. | 700/166 |
| 5,059,266 A | 10/1991 | Yamane et al. | 156/64 |
| 5,121,329 A | 6/1992 | Crump | 700/119 |
| 5,140,937 A | 8/1992 | Yamane et al. | 118/695 |
| 5,189,781 A | 3/1993 | Weiss et al. | 29/527.2 |
| 5,209,878 A | 5/1993 | Smalley et al. | 264/401 |
| 5,216,616 A | 6/1993 | Masters | 264/401 |
| 5,263,130 A | 11/1993 | Pomerantz et al. | 345/418 |
| 5,287,435 A | 2/1994 | Cohen et al. | 345/418 |
| 5,303,141 A | 4/1994 | Batchelder et al. | 700/29 |
| 5,340,433 A | 8/1994 | Crump | 156/578 |
| 5,383,131 A | 1/1995 | Itamoto et al. | 700/187 |
| 5,398,193 A | 3/1995 | deAngelis | 700/119 |
| 5,402,351 A | 3/1995 | Batchelder et al. | 700/119 |
| 5,432,704 A | 7/1995 | Vouzelaud et al. | 700/182 |
| 5,460,758 A | 10/1995 | Langer et al. | 264/401 |
| 5,503,785 A | 4/1996 | Crump et al. | 264/40.7 |
| 5,506,607 A | 4/1996 | Sanders, Jr. et al. | 347/1 |
| 5,535,128 A | 7/1996 | Laube et al. | 700/119 |
| 5,554,336 A | 9/1996 | Hull | 264/401 |
| 5,572,431 A | 11/1996 | Brown et al. | 700/95 |
| 5,594,652 A | 1/1997 | Penn et al. | 700/119 |
| 5,596,504 A | 1/1997 | Tata et al. | 700/120 |
| 5,602,748 A | 2/1997 | Seki et al. | 700/187 |
| 5,622,216 A | 4/1997 | Brown | 164/71.1 |
| 5,633,021 A | 5/1997 | Brown et al. | 425/375 |
| 5,649,277 A | 7/1997 | Greul et al. | 419/2 |
| 5,663,883 A | 9/1997 | Thomas et al. | 700/119 |
| 5,694,324 A | 12/1997 | Masters et al. | 700/118 |
| 5,738,817 A | 4/1998 | Danforth et al. | 264/603 |
| 5,740,051 A | 4/1998 | Sanders, Jr. et al. | 700/119 |
| 5,859,775 A | 1/1999 | Barlage, III et al. | 700/108 |
| 5,866,058 A | 2/1999 | Batchelder et al. | 264/237 |
| 5,900,207 A | 5/1999 | Danforth et al. | 264/603 |
| 5,906,863 A | 5/1999 | Lombardi et al. | 427/385.5 |
| 5,968,561 A | 10/1999 | Batchelder et al. | 425/375 |
| 5,969,971 A | 10/1999 | Brown et al. | 700/119 |
| 6,021,358 A | 2/2000 | Sachs | 700/98 |
| 6,027,326 A | 2/2000 | Cesarano, III et al. | 425/375 |

OTHER PUBLICATIONS

Mark A. Hall et al., "Feature Abstraction in Knowledge–Based Critique of Designs", Issues in Design/Manufacture Integration–1990, DE–vol. 29, The American Society of mechanical Engineers, 1990, pp. 43–49.

Bertoldi M., Yardimici M.A. et al., "Domain Decomposition and Space Filling Curves in Tool path Planning and Generation", Solid Freeform Fabrication Proceedings, Aug. 1998, pp. 267–274.

Vikram R. Jamalabad et al., "Process Improvements in Fused Deposition of Ceramics (FDC): Progress Towards Structurally Sound Components", Extended Abstract 96–DETC–DFM–1279, 1 page, dated prior to Sep. 7, 2000.

D.T. Lee, "Medical Axis Transformation of a Planar Shape", III Transactions on Pattern Analysis and Machine Intelligence, vol. PAMI–4, No. 4, Jul. 1982, pp. 363–369.

Stratasys, Inc., "QuickSlice Manual", Jun. 17, 1996, pp. Q1–Q20 and Q71–Q76.

Dong, Z. et al., "Optimal Rough Machining of Sculptured Parts on a CNC Milling Machine", Transactions of the American Society of Engineers, Series B: Journal of Engineering for Industry, ASME, New York, U.S., vol. 115, NR. 4, pp. 424–431.

Kulkarni, P. et al., "An Accurate Slicing Procedure for Layered Manufacturing", Computer Aided Design, Elsevier Publishers BV., Barking, BG, vol. 28, NR. 9, pp. 683–697.

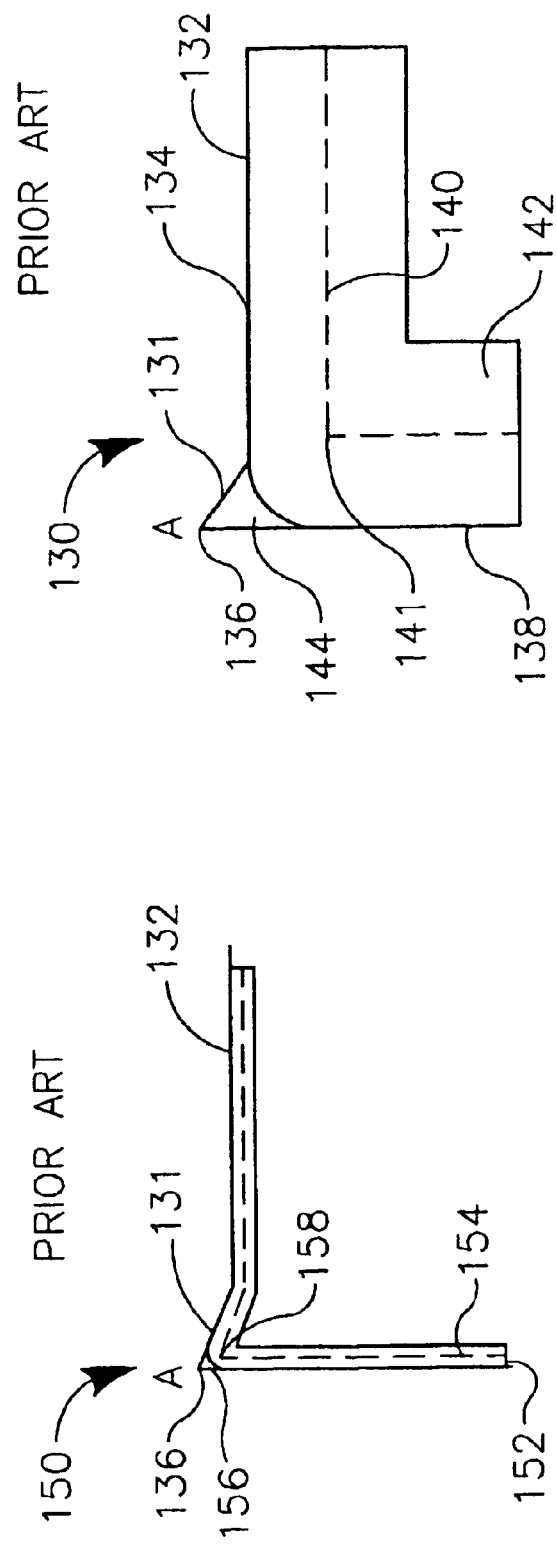

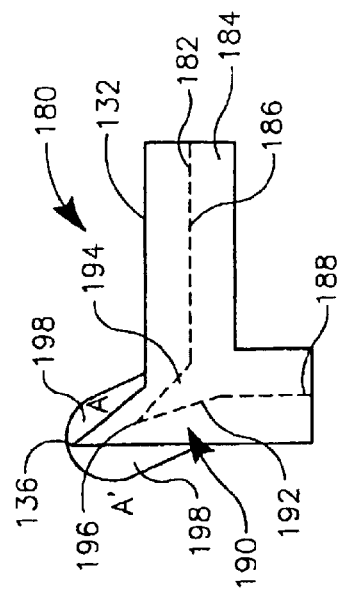
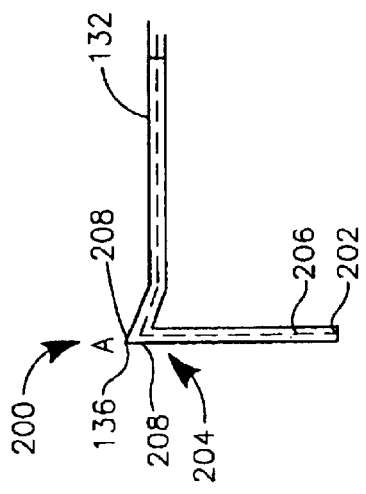
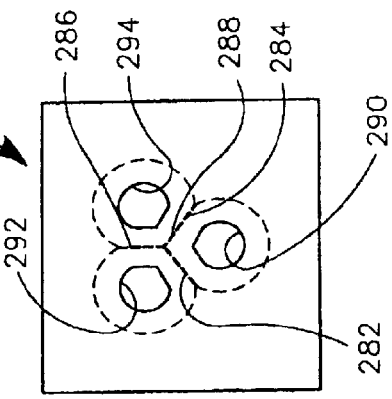
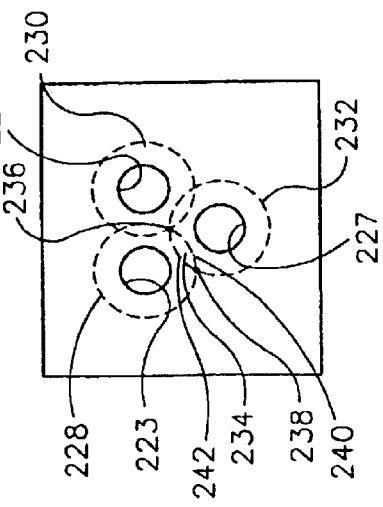

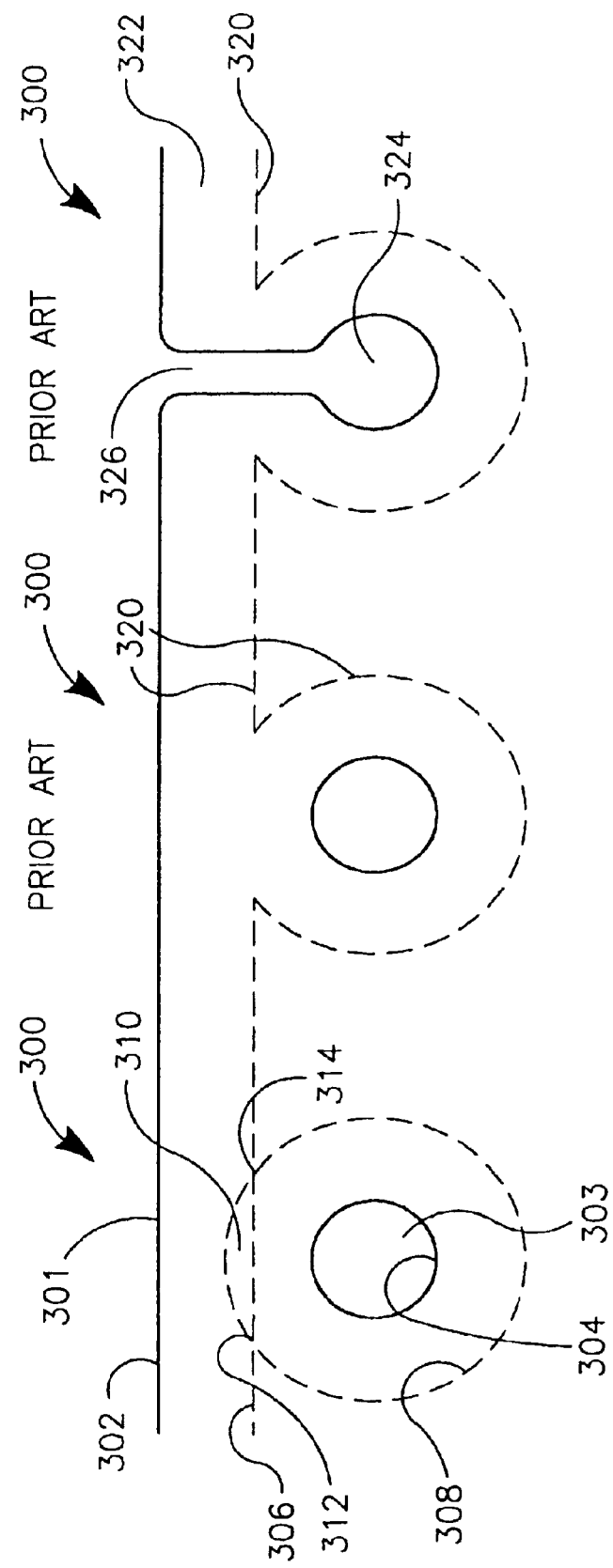

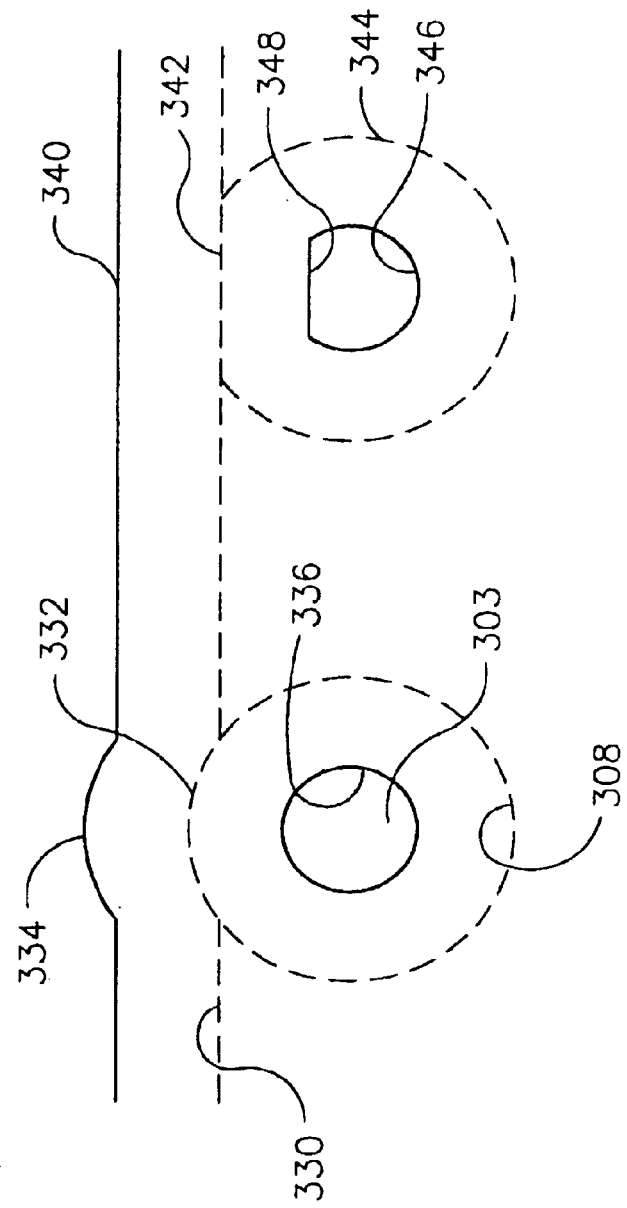

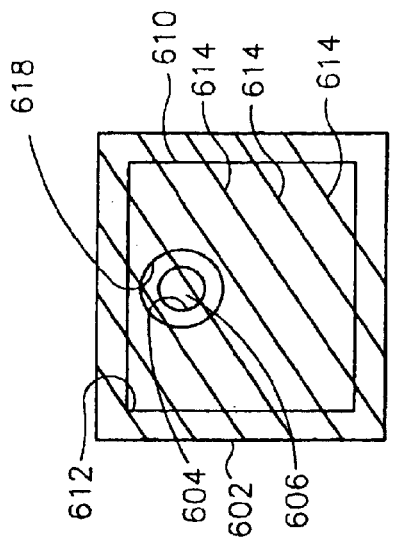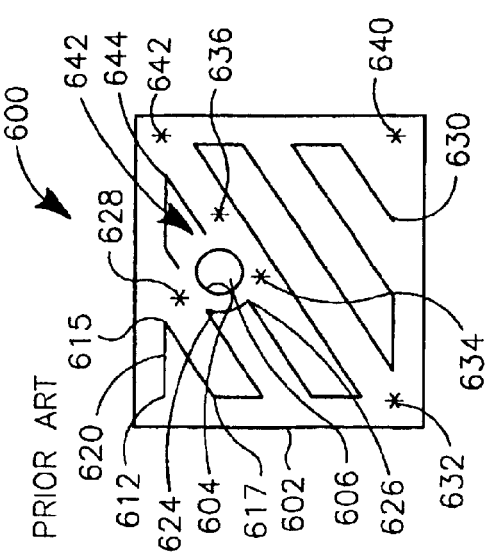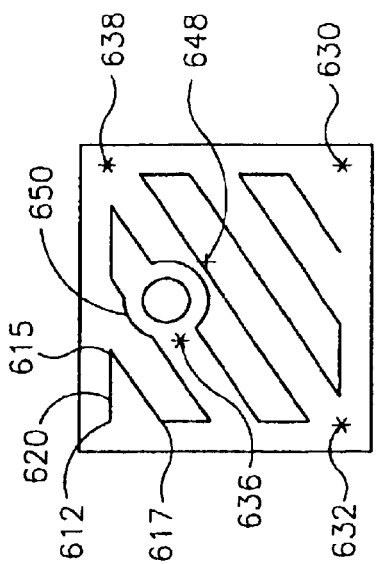
FIG. 12B
FIG. 12A PRIOR ART
FIG. 13

TOOL PATH PLANNING PROCESS FOR COMPONENT BY LAYERED MANUFACTURE

This invention was made with Government support under contract No. N00014-94-C-0115. The Government has certain rights in the invention.

RELATED APPLICATIONS

The present application is related to co-pending U.S. patent application Ser. No. 09/656,770 now U.S. Pat. No. 6,682,684, entitled PROCEDURES FOR RAPID BUILD AND IMPROVED SURFACE CHARACTERISTICS IN LAYERED MANUFACTURE, filed on date even herewith.

FIELD OF THE INVENTION

The present invention is related generally to machine manufacturing of components. In particular, the present invention is related to rapid prototyping manufacturing including layered manufacturing and solid freeform fabrication.

BACKGROUND OF THE INVENTION

Using conventional techniques, a desired article to be made can initially be drawn, either manually or automatically utilizing a computer-aided design (CAD) software package. The article can be formed by removing material from material stock to form the desired shape in a machining operation. The machining operation may be automated with a computer-aided machining (CAM) process. The design and manufacture process may be repeated multiple times to obtain the desired part. A common practice is to mechanically remove material to create three-dimensional objects, which can involve significant machining skills and turn around time.

One process for making three-dimensional objects builds up material in a pattern as required by the article to be formed. Masters, in U.S. Pat. No. 4,665,492, discusses a process in which a stream of particles is ejected and directed to coordinates of the three-dimensional article according to data provided from a CAD system. The particles impinge upon and adhere to each other in a controlled environment so as to build up the desired article.

Processes and apparatus also exist for producing three-dimensional objects through the formation of successive laminae which correspond to adjacent cross-sectional layers of the object to be formed. Some stereo lithography techniques of this type use a vat of liquid photocurable polymer which changes from a liquid to a solid in the presence of light. A beam of ultraviolet light (UV) is directed to the surface of the liquid by a laser beam which is moved across the liquid surface in a single plane, in a predetermined XY pattern, which may be computer generated by a CAD system. In such a process, the successive layers may be formed in a single horizontal plane, with successive layers solidifying together to form the desired object. See, for example, U.S. Pat. No. 4,575,330 to Hull. Arcella et al., in U.S. Pat. No. 4,818,562, discuss a method for forming an article by directing a laser beam on a fusible powder which is melted by the beam, and which solidifies to form the desired shaped object.

Recently, various solid freeform fabrication techniques have been developed for producing three-dimensional articles. One such technique, used by Stratasys, Inc. (Eden Prairie, Minn.), is referred to as Fused Deposition Modeling (FDM). See, for example, U.S. Pat. No. 5,121,329 to Crump, herein incorporated by reference. FDM builds solid objects, layer by layer, from polymer/wax compositions according to instructions from a computer-aided design (CAD) software program. In one FDM technique, a flexible filament of the polymer/wax composition is heated, melted, and extruded from the nozzle, where it is deposited on a workpiece or platform positioned in close proximity to the dispensing head. The CAD software controls the movement of the dispensing head in the horizontal X-Y plane and controls the movement of the build platform in the vertical Z direction. By controlling the processing variables, the extruded bead or "road" can be deposited layer by layer in areas defined by the CAD model, leading to the creation of the desired three-dimensional object.

Other examples of layered manufacturing techniques include multi-phase jet solidification techniques and/or laser-engineered net shaping. The extruded bead can be a ceramic suspension or slurry, a molten plastic, a powder-binder mixture, a polymeric material ready for curing or hardening, a molten metal, or other suitable materials which harden with time and/or exposure to an external stimulus. The bead can also be a curable strip of polymer or pre-polymer with polymerization initiated by radiation.

Conventional machining techniques utilize "subtractive" machining in which material is subtracted from a block of material. An example of subtractive machining is milling. Use of a subtractive computer controlled machine, such as a computer controlled milling machine, requires describing a tool path for the machine cutting element to follow in removing portions of the material stock. A cutting burr typically has a center axis and a known radius. A tool path for the cutting burr to follow is usually a series of line segments, line segment end points, or curves. The tool path may be generated according to a first rule that the innermost tool path stays about one burr radius from the surface perimeter to be formed. In an "additive" manufacturing method, such as solid freeform manufacturing, the first rule from subtractive manufacturing has been informally adapted. The additive first rule is that the outermost tool path should come no closer than about half a bead width from the surface perimeter to be formed.

There are problems caused by a material depositing head following a tool path generated according to this first rule. Surface features that have a width less than a bead width cannot be entered by the depositing head, as the bead would extend outside of the surface perimeter to be formed. As a result, a narrow protrusion or vertex to be formed is not formed at all. This is contrary to the design intent.

A second, related rule for additive tool paths is that the tool path should not come closer than about half a bead width to an inner perimeter defining an interior feature. This rule prevents the path from filling in an interior feature, but can cause interior solid features of less than one bead width to be under-defined. In one example, two holes separated at their perimeters by less than a bead width will be formed as a single oblong hole, as the tool path cannot both follow the second rule and come between the two holes.

A third rule for additive tool paths is that the tool path should not cause the bead to cross the boundary of another bead, already generated from another tool path portion. As a contour, or outer perimeter following tool path may be more important, it is often generated first, to insure a surface closely resembling the design surface. In one case, often found in narrow parts, the inside surfaces of the contour tool path beads may come closer together than one bead width.

A void will result at this location, as no tool path following along the contour tool path can enter this narrow region without violating the third rule.

Current processes for generating tool paths may include beginning at the outer perimeter and offsetting that perimeter inward into the material portion by about half the expected bead width. The resulting outer boundary can be used to define a contour tool path to define the limits for a raster tool path. In one situation, a first outer contour tool path may be offset within an outer perimeter vertex to create an outer boundary. If the outer boundary is used to form a contour bead to form the perimeter vertex, the interior of the contour bead may in turn form a second vertex, which may also present a problem in filling.

Another problem with existing technologies includes the creation of weak spots within the filled areas of solid slices made using raster filled layered manufacturing techniques. Yet another problem is the creation of perimeter gaps or sub-perimeter voids where raster tool paths meet perimeters or contour beads, respectively. What would be desirable are methods for generating tool paths that ameliorate some of the above-discussed deficiencies.

SUMMARY OF THE INVENTION

The present invention provides methods for improving the manufacture of objects made by layered manufacturing techniques through improved tool path generation. A vertex improvement aspect improves tool paths used to form vertices. Outer perimeter vertices can be improved by automatically creating an outer boundary reflecting the design intent to have material extending to the outer perimeter vertex. The outer boundary can be used as a contour tool path or as a limit to travel by raster tool paths. Boundary vertices within parts can be improved by extending more internal boundary vertices outward toward enclosing vertices, thereby eliminating some internal voids. Contour boundaries near outer perimeter corners can be better defined by extending outward a contour tool path toward the corners. Narrow regions between combinations of outer and/or inner perimeters can be filled through improved tool paths. Layer regions near inner voids can receive consistent filling through an improved raster tool path method.

One aspect of the invention improves the definition of designed perimeter vertices, for example, external protrusions, by creating an improved outer boundary. A conventional outer boundary is offset inward from the outer perimeter by about half the expected bead width to be deposited. The conventional offset method reduces the material extent at vertices. The present invention provides methods for creating an outer boundary vertex that is extended outward, toward the outer perimeter vertex. One set of methods accepts a conventional outer boundary as input, and can automatically relocate the vertices outward. Another set of methods creates a similar outer boundary, but without going through the intermediate step of generating a conventional outer boundary first. The outer boundaries can be used as contour tool paths or as limits to travel by raster tool paths.

The vertices created for internal tool paths can be improved by extending outward a more inner boundary vertex toward an enclosing, more outer boundary vertex. The more inner boundary vertex can be relocated to a center-to-center, boundary-to-boundary distance closer to the expected bead width. In one method, the more outer boundary is used as a contour tool path while the more inner boundary is used as a limit to travel by raster tool paths. In another method, both the more outer and more inner boundaries are used as contour tool paths. Reducing the internal, vertex-to-vertex distance can reduce or eliminate internal voids in parts.

Another aspect of the invention preserves internal designed features that are located close together. Internal voids located closer together than one bead width are not well defined by conventional tool path techniques because extending a tool path through the narrow region between the voids will extend past the offset boundaries around the void perimeters. The present invention allows a user to select relative weightings for preserving either or both void inner perimeters. Some embodiments provide improved tool paths in narrow regions between outer perimeters and inner void perimeters, which may be the case where inner voids are located near a part surface. Methods provided allow the user to create tool paths equidistant from each perimeter, or to create tool paths using methods such as medial axis transformations. Where one perimeter is to be given much greater weight, that perimeter offset boundary can be used to clip the other offset boundary or boundaries.

In yet another aspect of the invention, methods are provided which specify how raster tool paths are to be generated in the region near inner void perimeters. In one set of methods, a tool path is generated to follow at the offset distance around one side of void perimeter upon first intersection with the void offset boundary. Upon last intersection with the same offset boundary, a tool path is generated to follow at the offset distance around the opposite side of the void perimeter.

In one method, the tool path begins at an origin and attempts to travel away from the origin in a first axis direction along guide lines or in guide directions parallel to a second axis which can be perpendicular to the first axis. The tool path travel is constrained to travel along offset boundaries where they are intersected, to avoid invading the boundary interiors. When guide lines are intersected, or when certain increments of distance are reached in the first axis direction, travel can change to a direction parallel to the second axis, such as travel along a guide line. When the next guide line or increment of distance is reached, travel can continue in a reverse direction along the guide line. When an inner boundary is intersected for the first time, the tool path can travel along the boundary in a direction initially most toward the origin. When the inner boundary is intersected for the last time, the tool path can travel along the boundary in a direction initially most away from the origin. When a boundary is intersected intermediate the first and last times, travel can continue along the boundary away from the origin until the next guide line is reached, whereupon the travel direction is reversed relative to the last guide line travel.

In one aspect of the invention, raster tool path vertices can be automatically positioned such that gaps or sub-perimeter voids in between raster beads near an outer boundary can be eliminated or reduced. The raster beads can be considered formed as pairs having an outbound raster tool path segment heading toward the outer boundary, forming a first raster vertex heading into a turnaround segment which substantially parallels the outer boundary, and the turnaround segment forming a second raster vertex heading into an inbound segment heading away from the outer boundary. The gaps or sub-perimeter voids can be eliminated by positioning the first and second raster vertices such that they are disposed at the appropriate distance from the outer boundary.

In one set of methods, an outbound raster tool path from one pair is projected out to an outbound raster intersection point on the outer boundary. A locator, inter-pair line is also projected out to an intersection with the outer boundary. The adjacent, inbound raster tool path from the adjacent pair is projected out to an inbound raster intersection point on the outer boundary. If the outer boundary has no intermediate vertices between the respective raster tool path intersection point and the inter-pair intersection point, then the inter-pair intersection point is used as a location point to relocate the first and second original raster vertices.

If the outer boundary has such intermediate vertices, then these vertices are used in combination with the inter-pair intersection point to serve as a point to relocate the appropriate raster vertex. The intermediate vertices may be formed by the inwardly offset outer perimeter vertices. In one embodiment, raster vertices lie on a raster which has already been relocated at least once due to contour jogging as previously described. In this embodiment, the previously relocated vertices are not further relocated. Where the outer boundary is the outer perimeter, the intersection points between the outer perimeter and the projected raster lines and inter-pair lines can be used to position the raster vertices about half the raster bead width from the intersection points. When the outer boundary is effectively the inside of the contour bead, the intersection points can be used to position the raster vertices about half the raster bead width from the intersection points.

BRIEF DESCRIPTION OF THE DRAWINGS

FIGS. 3A, 3B, 3D, and 3E are top, cross-sectional views through prior art single layer outer perimeter vertex regions, some illustrating the lack of outer perimeter vertex definition;

FIGS. 4A and 4B are top, cross-sectional views through single layer outer perimeter regions, having tool path vertices automatically positioned closer than the prior art to the outer perimeter vertices;

FIG. 5B is a top, cross-sectional view of the single layer design of FIG. 5A, after formation of the inner boundaries offset from the inner void perimeters;

FIG. 6 is a top, cross-sectional view of a single layer formed according to FIGS. 5A and 5B, using the present invention, and having three distinct voids;

FIG. 7A is a top, cross-sectional view of a single layer design having an inner void near a surface, with the inner perimeter and outer perimeter separated by less than one bead width, after formation of an inner boundary offset from the inner void perimeter, and an outer boundary offset from the outer perimeter;

FIG. 7B is a top, cross-sectional view of the single layer design of FIG. 7A, after the interfering offset boundaries have been removed using prior art methods;

FIG. 7C is a top, cross-sectional view of a prior art, single layer formed according to FIGS. 7A and 7B, having a surface channel rather than a distinct inner void;

FIG. 8A is a top, cross-sectional view of a single layer formed according to FIG. 7A, using the present invention, having a distinct, round inner void and an external surface disturbance;

FIG. 8B is a top, cross-sectional view of a single layer formed according to FIG. 7A, using the present invention, having a distinct, flat-sided inner void and an external flat surface;

FIG. 12A is a top, cross-sectional view of a prior art tool path generated to produce a layer portion having a square outer perimeter and round inner perimeter;

FIG. 12B is a top, cross-sectional view of guide lines and offset boundaries generated for use in forming the raster tool paths of FIGS. 12A and 13;

FIG. 13 is a top, cross-sectional view of a tool path generated to produce a layer portion having a square outer perimeter and round inner perimeter, having improved filling near the inner perimeter;

DETAILED DESCRIPTION OF THE INVENTION

Figure 1:
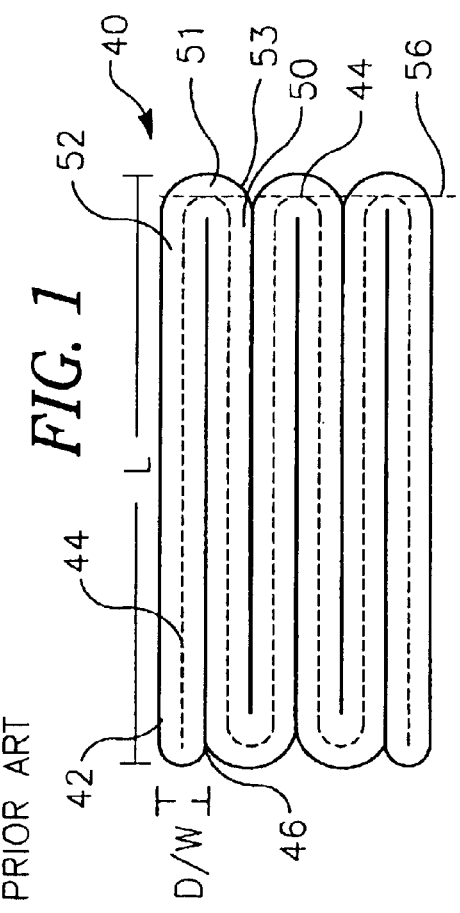
FIG. 1 is a top, cross-sectional view through a single layer of a prior art object formed by a bead deposited along a tool path.

FIG. 1 illustrates a top view of a single layer of an object 40 made using layered manufacturing techniques. Object 40 is formed from a single bead 42 laid along a tool path 44, having a zigzag raster pattern to substantially fill a rectangular area. Bead 42 has a diameter or width indicated at D/W and a length indicated at L. Bead 42 may be seen to flow together at inter-bead region 46 where adjacent sections of the bead abut one another. Bead 42 and object 40 may be formed using any suitable manufacturing technique, for example, fused deposition techniques, multi-phase jet solidification techniques, or laser-engineered net shaping techniques. Bead 42 can be a ceramic suspension or slurry, a molten plastic, a powder-binder mixture, a polymeric material ready for curing or hardening, a molten metal, or other suitable materials which harden with time and/or exposure to an external stimulus. Bead 42 can also represent a curable strip of polymer or pre-polymer with polymerization initiated with UV radiation.

Figure 2:
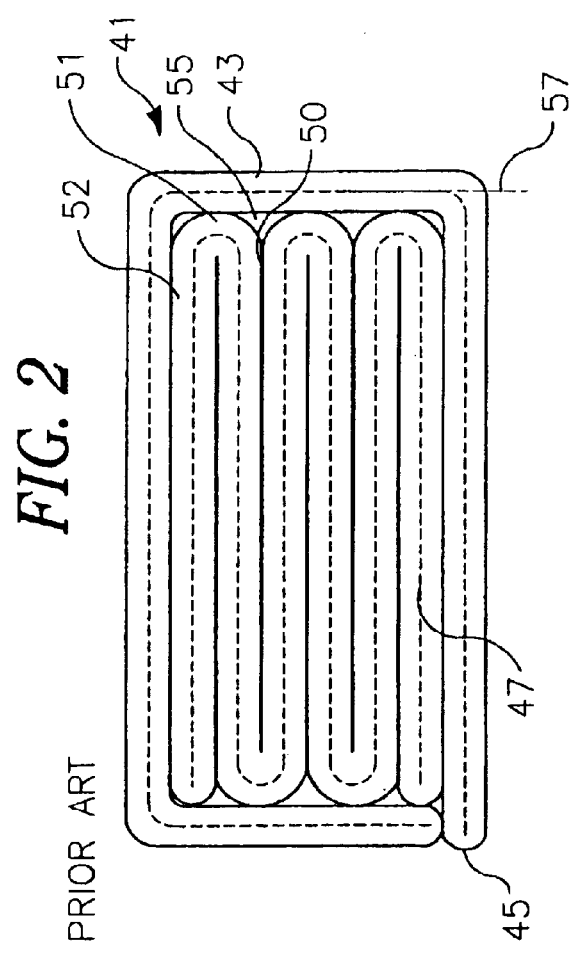
FIG. 2 is a top, cross-sectional view through a single layer of a prior art object formed by a bead deposited along a tool path, including a perimeter contour tool path.

Referring now to FIG. 2, another object 41 is illustrated, also formed using layered manufacturing. Object 41 is similar to object 40 of FIG. 1, but has an outer contour bead 43 formed of a first bead 45 which surrounds an internal second bead 47.

FIG. 1 illustrates one feature of conventional techniques, where an outbound bead 50 extends into a turn around bead portion 51, and thereafter into an inbound bead portion 52. A bed pair is thus formed by bead portions 50 and 52. A surface gap or void 53 may be seen to extend into the surface near the outside of turn around bead portion 51. Similarly, FIG. 2 illustrates a sub-perimeter void 55 formed in a similar manner within the boundary of contour bead 43. FIG. 1 also illustrates how a desired surface perimeter can be formed by establishing an outer boundary line 56 offset about half a bead width within the desired surface perimeter. Boundary line 56 can be used to limit travel by the tool path center line forming the bead. FIG. 2 illustrates how a desired surface perimeter can be formed by establishing an outer boundary line 57 offset about half a bead width within the desired surface perimeter. Boundary line 57 can be used as a contour tool path center line to form a contour bead. Both FIGS. 1 and 2 illustrate conventional layered manufacturing techniques.

Figure 3B:
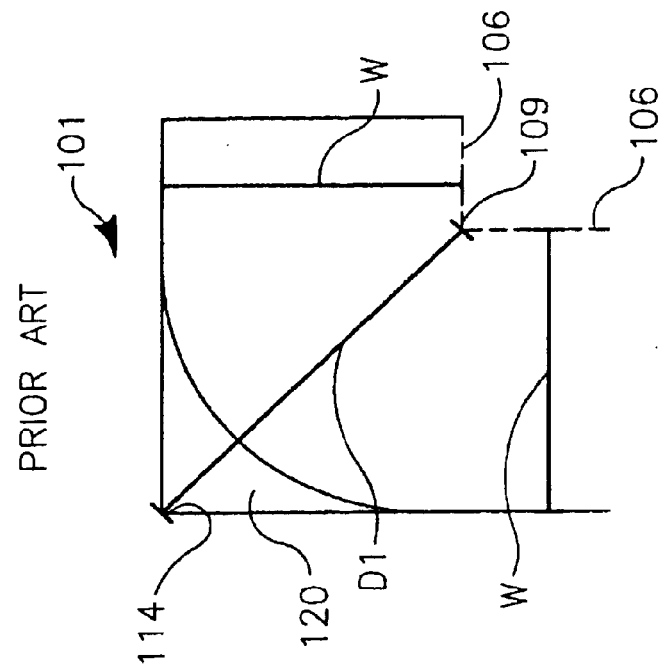
Figure 3A:
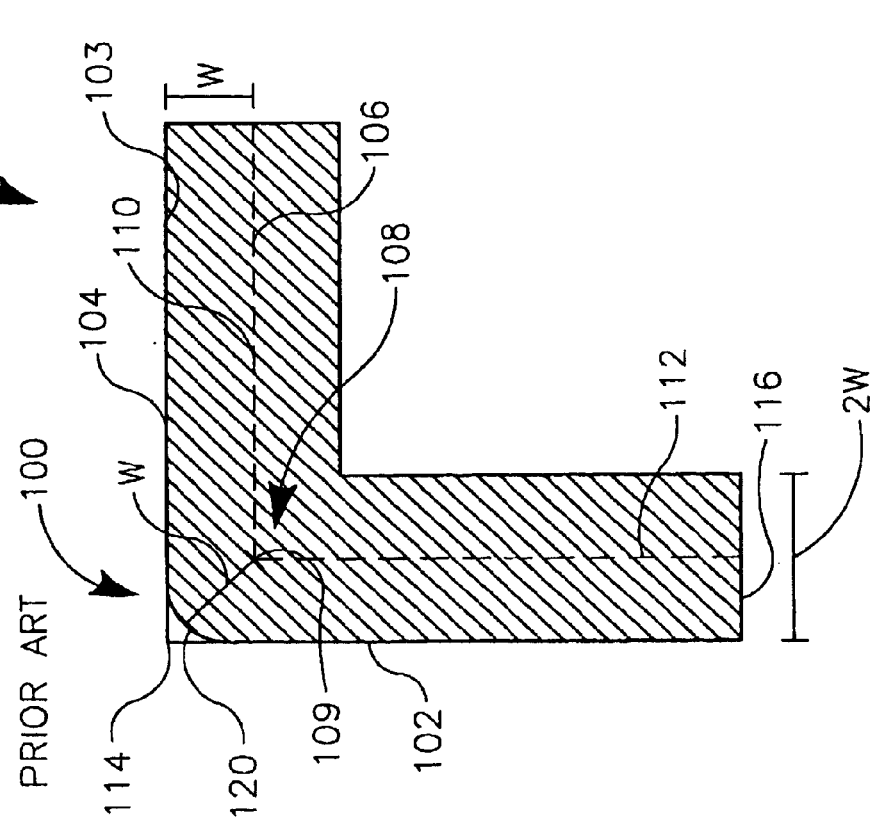

Referring now to FIGS. 3A through 3D, shortcomings of conventional methods are illustrated. FIG. 3A illustrates a layer portion 101 having an outer perimeter 103 of a part as designed, with outer perimeter 103 to be filled with material formed or deposited by a layered manufacturing operation. Outer perimeter 103 includes a vertex portion 100 having a vertex tip portion 114 disposed between a first leg 102 and a second leg 104. A road or bead 116 is illustrated, having a width indicated by "2W", and an offset indicated by "W", where the offset corresponds to about half the expected bead width associated with the tool path. The center line of a tool path 106 is indicated as having a vertex portion 108, including a vertex tip 109 disposed between a first leg 112 and a second leg 110. As can be seen from inspection of FIG. 3A, tool path 106 is located at an offset distance W from outer perimeter 103 near first perimeter leg 102 and second perimeter leg 104. Tool path vertex tip 109 is a greater distance than W from perimeter vertex tip 114, leaving a void region 120, unfilled by bead 116.

FIG. 3B illustrates layer portion 101 near perimeter vertex tip 114 in greater detail. Void 120 may be seen to lie between tool path vertex tip 109 and perimeter vertex tip 114. The distance from tool path vertex tip 109 to perimeter vertex tip 114 is indicated by "D1", where D1 is equal to about the square root of 2 multiplied by the offset W, which follows from the Pythagorean theorem, as the hypotenuse of a triangle is longer than either base. In FIGS. 3A and 3B, tool path 106 is drawn as offset inward from outer perimeter 103 near outer perimeter legs 104 and 102 by an offset amount of W. The use of a contour bead such as bead 116 is but one way of filling the layer portion with material. Another filling technique is illustrated in FIG. 3C.

Figure 3C:
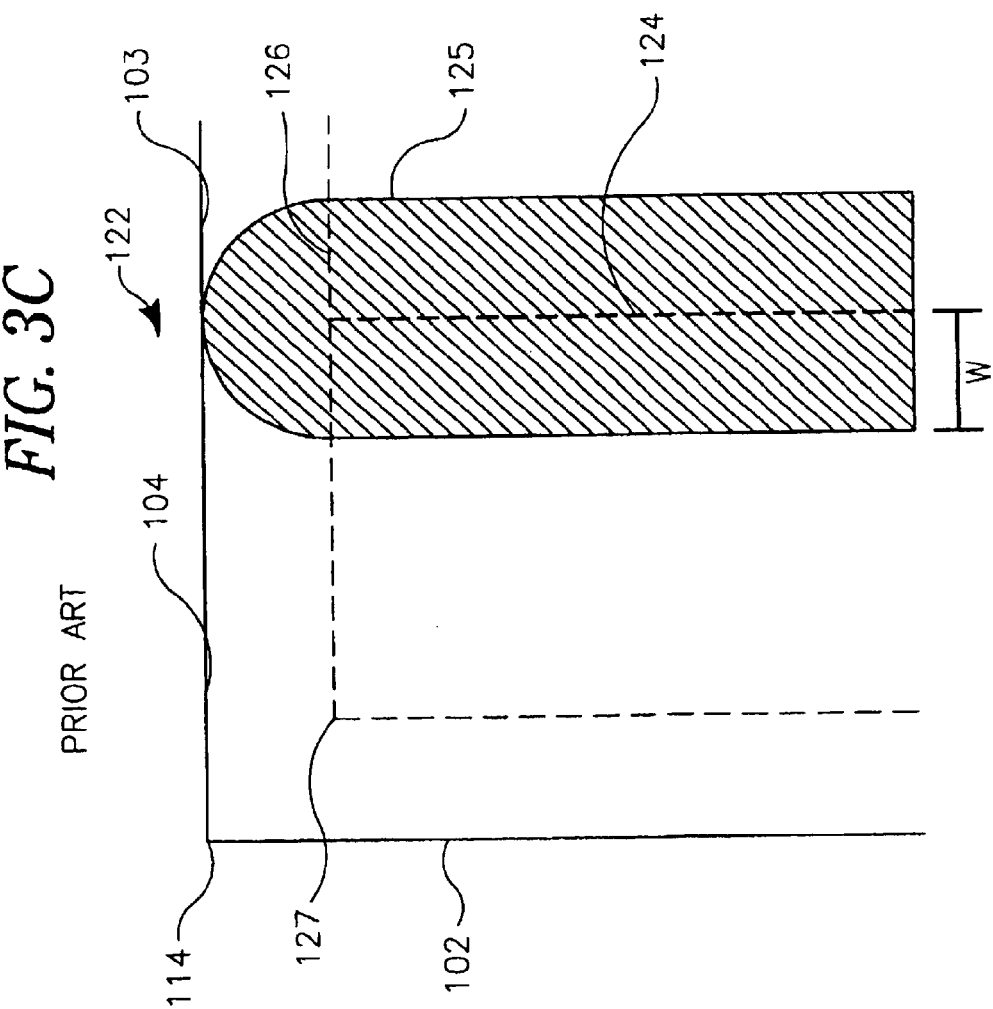
FIG. 3C is a top, cross-sectional view through a single layer of a prior art object formed by a raster bead deposited along a raster tool path extending up to an outer boundary.

FIG. 3C illustrates: another layer portion 122 also designed to fill outer perimeter 103, but using a raster bead 125 created by a tool path center line 124 and having an offset W corresponding to about half of the expected bead width. Only a single bead is shown, but in normal use, multiple parallel raster tool paths, turn around regions, and resulting beads would be used to fill outer perimeter 103. In particular, tool path center line 124 could be expected to turn right or left and follow outer boundary 126 for a turn around raster segment, followed by another raster segment parallel to raster line 124. An outer boundary 126 having a vertex tip 127 may be seen to be offset inward from outer perimeter 103 by an amount W. FIG. 3C thus illustrates the situation where the raster tool path approaches the outer perimeter no closer than about the offset distance W. In both FIGS. 3A and 3C, a line offset inward from the outer perimeter serves as a boundary to limit the travel of the tool path. In FIG. 3A, the tool path center line is a contour line which comes no closer than the boundary line. In FIG. 3C, the tool path center line is a perpendicular line which comes no closer than the outer boundary line. As is discussed below, the present invention includes methods for adjusting the location of vertex tips 109 and 127 so as to reduce or eliminate voids such as void 120.

FIG. 3D illustrates another layer portion 130 having an outer perimeter protrusion 131. An outer perimeter 132 defines the design intent, having a outer perimeter vertex tip 136 disposed between a first leg 138 and a second leg 134. A tool path center line 140 having a tool path vertex 141 determines how a bead 142 will later be formed or deposited. As can be seen from inspection of FIG. 3D, a void 144 is left between bead 142 and outer perimeter vertex 136, showing that the intent of the part design is not being fulfilled. In particular, the corner of the part formed will be rounded and have no protrusion.

FIG. 3E illustrates yet another layer portion 150, having the same outer perimeter 132 and outer perimeter vertex tip 136 as illustrated in FIG. 3D. Layer portion 150 has a bead 152 deposited along a tool path 154, wherein bead 152 has a smaller bead width than bead 142 of FIG. 3D. The smaller bead width corresponds to a smaller offset, which allows tool path 154 to extend into protrusion 131 along a tool path vertex portion 158, leaving a smaller void 156 than void 144 of FIG. 3D.

FIG. 4A illustrates one aspect of the present invention for addressing the shortcomings illustrated in FIGS. 3A through 3E. FIG. 4A illustrates a layer portion 180 including the same outer perimeter 132 of FIG. 3D, but having a different tool path 182 and bead 184 formed along tool path 182. Tool path 182 has a first leg portion 186, a vertex portion 190, and a second leg portion 188. Tool path vertex portion 190 includes a vertex first leg 194, a vertex second leg 192, and a vertex tip 196.

As can be seen from inspection of FIG. 4A, tool path vertex 196 extends closer to outer perimeter vertex 136 than tool path vertex 141 of FIG. 3D. In one embodiment, tool path vertex 196 is relocated to a distance of about one tool path offset distance from outer perimeter vertex 136, causing outer perimeter vertex 136 to be formed by the outer boundary of bead 184 at the vertex. FIG. 4A also illustrates that overfilled regions 198 are formed beyond outer perimeter 132. The manufactured layer is thus under-defined in FIG. 3D, and over-defined in FIG. 4A, relative to the original design intent. In a preferred embodiment, a designer can select whether features are to be over-defined or under-defined. The relocation of tool path vertex 196 can be determined according to one of several methods. In one method, a line is drawn between the original tool path vertex and the outer perimeter vertex, followed by moving the tool path vertex along the line to a desired distance from the outer perimeter vertex. The tool path can be modified by adding transition regions corresponding to tool path vertex legs 194 and 192 and splicing them into the original tool path to provide a modified tool path. Relocation of tool path vertices is discussed below in greater detail.

FIG. 4B illustrates another layer portion 200, also formed along outer perimeter 132 and outer perimeter vertex tip 136. Layer portion 200 includes a tool path 202 having a tool path vertex portion 204 and a bead 206 laid down along tool path 202. Bead 206 has a bead width and an associated offset less than that of bead 184 of FIG. 4A, as well as a correspondingly smaller amount of overfilling at 208. FIG. 4B eliminates void 156 illustrated in FIG. 3E. FIGS. 4A and 4B thus illustrate one aspect of the present invention termed "contour boundary jogging", where the corner or vertex of a contour boundary can be automatically moved closer to a vertex to decrease the distance between the tool path and a vertex specified by the original design perimeter.

Figure 5C:
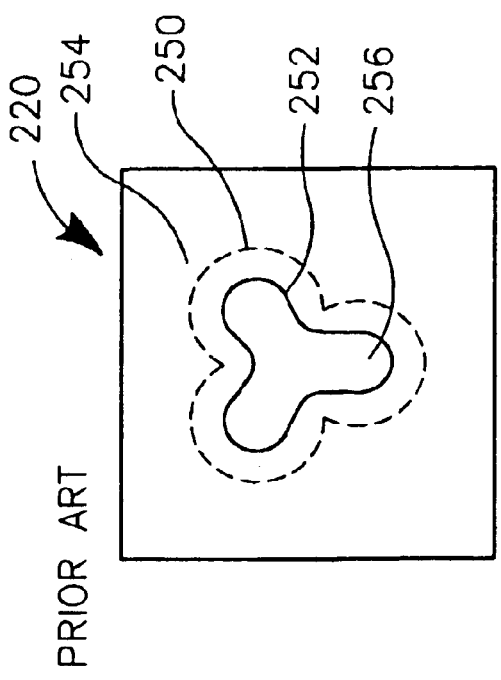
FIG. 5C is a top, cross-sectional view of a prior art, single layer formed according to FIGS. 5A and 5B, having a single tri-lobed void.
Figure 5A:
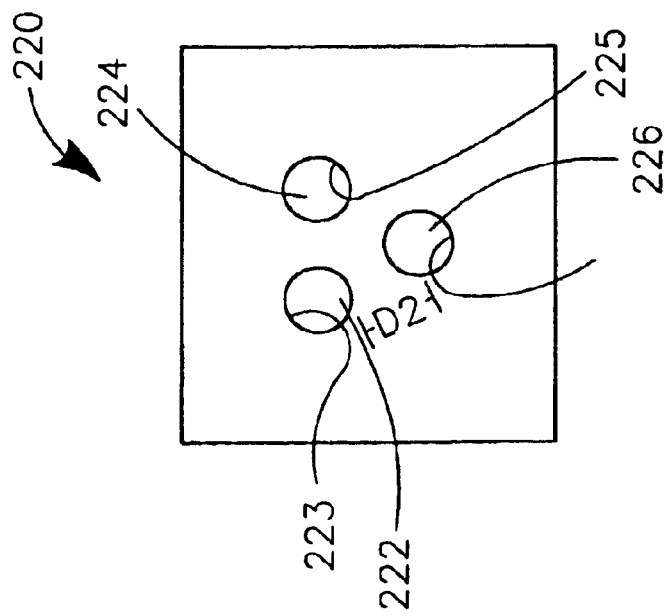
FIG. 5A is a top, cross-sectional view of a single layer design having three internal voids with the inner perimeters separated by less than one bead width.

FIG. 5A illustrates another shortcoming of conventional layered manufacturing techniques. An original layer portion design 220 includes three internal voids 222, 224, and 226, having inner perimeters 223, 225, and 227 respectively. Inner perimeters 227 and 223 are separated by a distance indicated by "D2", where D2 is less than the expected bead width, or less than double the tool path offset. In the manufacturing of layer portion 220, a bead cannot be laid down between internal voids 222 and 226 without compromising inner void perimeters 223 and 227, as the bead is too wide.

FIG. 5B illustrates layer portion 220 after inner boundaries 228, 230, and 232 have been generated at an offset distance from inner void perimeters 223, 225, and 227, respectively. The offset boundaries correspond to the closest distance a tool path should approach the voids, either as inner contour tool paths or a raster tool path. The inner boundaries may be seen to intersect. Inner boundary 228 may be seen to intersect inner boundary 232 at points 236 and 238, defining arcuate line segments 240 and 242, as well as an intermediate region 234.

FIG. 5C illustrates a conventional resulting tool path 250 and resulting part 254 formed from tool path 250, including a tri-lobed inner void 256 having a void perimeter 252. Inner void 256 differs from the design intent indicated in FIG. 5A, having one hole rather than three. This difference is due to the tool path generating tool attempting to preserve inner perimeters 223, 225, and 227.

FIG. 5D illustrates one aspect of the present invention in an improved layer portion 280, resulting from one embodiment method for processing the inner voids and inner boundaries of FIG. 5B. In the method illustrated, new tool path portions 282, 284, and 286 have been generated which intersect at a point 288. After formation or deposition of a bead along the tool paths, three new inner perimeters 292, 294, and 290 will have been created, which are slightly different from the design of FIG. 5A. The inner voids illustrated in FIG. 6 do not have circular walls as called for by the design, but maintain the design intent to have three distinct voids. The new tool paths, by laying down beads wider than the space allowed for between the voids, reduce some of each of the void volumes.

In one embodiment, new tool paths such as tool paths 282, 284, and 286 are generated by creating lines equidistant from the perimeters the tool path extends between. In another embodiment, offset boundary intersection points such as points 238 and 236 are used as end points to draw tool paths between the points. In a preferred embodiment, intersecting regions such as region 234 are determined from the intersection of the offset inner boundaries. The intersecting regions are used as input to a medial axis transformation algorithm, which generates a geometric output such as a line, a curve, or a series of lines or curves, indicating one form of center for the area. The output of the medial axis transform can be used to generate the tool paths through the narrow regions between offset boundaries.

Referring now to FIGS. 7A through 7C, another aspect of the invention is illustrated. The aspect illustrated in FIGS. 7A through 7C may be considered related to the aspect illustrated in FIGS. 5A–5C and FIG. 6. In FIG. 7A, a layer portion 300 is illustrated, showing the design intent for an outer surface 301, an outer perimeter 302, an inner void 303, an inner void perimeter 304, an offset outer boundary 306, and an offset inner boundary 308. Outer boundary 306 has been offset inward from outer perimeter 302, and inner boundary 308 has been offset inward, into the material region, from inner perimeter 304. Inner boundary 308 may be seen to intersect outer boundary 306 at points 312 and 314, and forming an interference on intersection area 310 between the intersecting boundaries. The intersecting boundaries indicate that the perimeters of the inner void and the outer surface are too close together to allow a tool path and resulting bead to pass between them without disrupting either surface. One difference between the problem illustrated in FIG. 7A and that of FIG. 5B is that FIG. 7A involves one outer boundary and one inner boundary, while FIG. 5B involves only inner boundaries.

FIG. 7B illustrates a conventional approach to handling the problem offered by FIG. 7A. In FIG. 7B, the intersecting boundaries are used to clip each other, forming a new tool path 320 which does not extend closer than one offset toward either perimeter. FIG. 7C illustrates the part resulting from a bead 322 laid down along tool path 320. The bead laid down forms a channel 326 leading to a void portion 324, neither of which reflects the design intent of FIG. 7A.

FIG. 8A illustrates one method according to the present invention for dealing with the problem presented in FIG. 7A. In the illustrated method, inner boundary 308 has been preserved and used to clip outer boundary 306 of FIG. 7A, resulting in a tool path 330 which follows outer boundary 306 of FIG. 7A, then inner boundary 308 of FIG. 7A, along an arcuate tool path portion 332. A bead laid down along tool path 330 will form a surface disturbance 334 corresponding to inner boundary tool path portion 332. Inner void 303 has a circular inner perimeter 336, at the expense of a non-planar surface 334. FIG. 8A may be preferred where the design intent calls for a round hole, such as a pin mounting or containment hole. In one embodiment, a user, either human or machine, may indicate which of the conflicting or intersecting boundaries is to receive how much relative weight, or even total preference, as is the case in FIG. 8A.

FIG. 8B illustrates another method for resolving the problem presented by FIG. 7A. In the embodiment illustrated by FIG. 8B, outer boundary 306 of FIG. 7A has been used to clip inner boundary 308 of FIG. 7A, leaving a tool path flat portion 342 in the tool path. An arcuate tool path portion 344 remains of inner boundary 308 of FIG. 7A. The resulting tool path leaves a flat surface portion 340, but intrudes into the inner void, leaving an inner void 346 having a flat wall 348. Flat wall 348 illustrates the priority or greater weight given to having a flat exterior surface. Inner void 346 may be acceptable where either a flat outer surface is of great importance or where the circularity of the inner void is of less importance, as may be the case when the void is to be used as a cooling channel. In one embodiment (not requiring illustration), a medial axis transform is used to generate an arcuate tool path segment between points 312 and 314 of FIG. 7A. In yet another embodiment, an arcuate line segment is generated through intersect region 310, the segment being equidistant between inner boundary 308 and outer boundary 306. The resulting tool path and bead deposition will disturb both outer surface and void inner surface.

In one embodiment, in both the situations presented by FIGS. 5B and 7A, the user may indicate which of the competing boundaries or surfaces is to be maintained and/or to what extent. In one method, a percent relative weighting may be assigned to competing surfaces or boundaries. The weighting may be one hundred percent (100%) granted to one surface, as in FIGS. 8A and 8B, or split equally as in FIG. 6. In embodiments where one boundary or surface is given total relative weight, one boundary can be used to clip the other, as in FIGS. 8A and 8B. As with some other aspects of the invention, the design intent can be maintained at the expense of surface disturbances.

Figure 9A:
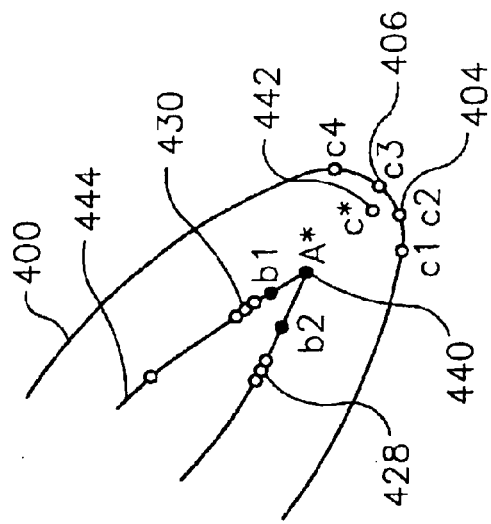
FIG. 9A is a top, cross-sectional view of an outer vertex design and an outer boundary, offset inward from the outer perimeter.
Figure 9B:
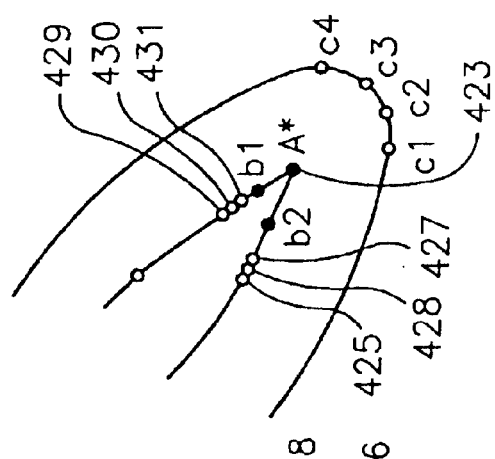
FIG. 9B is a top, cross-sectional view of the outer vertex design and outer offset boundary of FIG. 9A, after relocation of the outer boundary vertex toward the outer perimeter vertex.
Figure 9C:
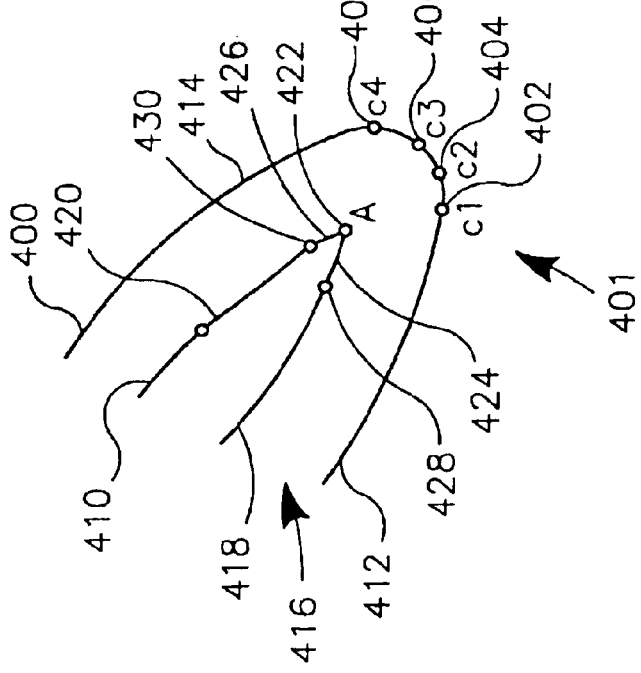
FIG. 9C is a top, cross-sectional view of the outer vertex design and outer offset boundary of FIG. 9A, after relocation of the outer boundary vertex toward the outer perimeter vertex, where the outer perimeter vertex is represented by an average vertex point.

FIGS. 9A through 9C illustrate another aspect of the invention which can be used to move a tool path vertex to better define an outer perimeter vertex or a vertex or corner of an internal contour bead. FIG. 9A illustrates an outer perimeter 400 for a object design, the perimeter having a perimeter vertex portion 401 which is defined by a poly-line defined by four points 402, 404, 406, and 408. Perimeter vertex portion 401 has a vertex tip which may be identified, for example, as being points 404 or 406, or an average thereof Perimeter 400 may be obtained from a slice through an object to be formed by layered manufacturing. Perimeter 400 corresponds to the bottom region of a thin blade 510 (illustrated in FIG. 10A). An offset generating algorithm can be applied to outer perimeter points 402, 404, 406, and 408. The offset generation can be used to create an outer boundary 410. Perimeter 400 includes perimeter vertex portion 401, which is disposed between a perimeter first leg 412 and a perimeter second leg 414. Outer boundary 410 can be used, and is used, as a tool path in conventional methods. Outer boundary 410 includes a tool path vertex portion 416 disposed between a tool path first leg 418 and a tool path second leg 420. Tool path vertex portion 416 includes a tool path vertex tip 422 disposed between a tool path vertex first leg 424 and second leg 426.

In the embodiment illustrated, tool path vertex first leg 424 extends from a first vertex base point 428 to vertex tip 422, and tool path vertex second leg 426 extends from a second vertex base point 430 to vertex tip 422. As may be seen from inspection of FIG. 9A, tool path second leg 420 is offset inward from perimeter first leg 414 by a distance W, corresponding to about half of the expected bead width. Tool path vertex tip 422 may be seen to lie at a distance from perimeter point 404, at a distance greater than W.

FIG. 9B illustrates the result of using one method of the present invention to act upon the tool path of FIG. 9A. In this method, first base point 428 is bracketed by a pair of points 425 and 427, and second base point 430 is bracketed by a pair of points 429 and 431, all located along the existing tool path. In one embodiment, the bracketing points are disposed at a distance of 0.010 inches, or ten percent (10%) of the line segment length, whichever is lesser. The trio of points, 425, 428, and 427, along with the trio of points 429, 430, and 431, are used as the base of a new tool path vertex.

Tool path vertex tip 422 is relocated to a new point 423 located closer to outer perimeter vertex tip portion 401. In one embodiment, point 422 is relocated such that the new point 423 is located at a distance about equal to the tool path offset distance from the perimeter vertex tip. In this method, the tool path will cause a bead to be laid down having an outer surface located at about the outer perimeter vertex tip called for by the design. In this embodiment, however, the tool path offset may extend beyond tool path first and second leg regions 412 and 414, causing overfilling by the deposited bead relative to the design perimeter. The design intent to have an object vertex at a given location may thus be given precedence over the design intent to have the original outer perimeter not overfilled.

FIG. 9C illustrates a tool path 444 generated from a relocated tool path vertex 440 in which the tool path vertex is relocated closer to an averaged perimeter vertex tip point 442, which is calculated as the average vertex tip point between points 404 and 406.

Figures 10A, 10B, 10C:
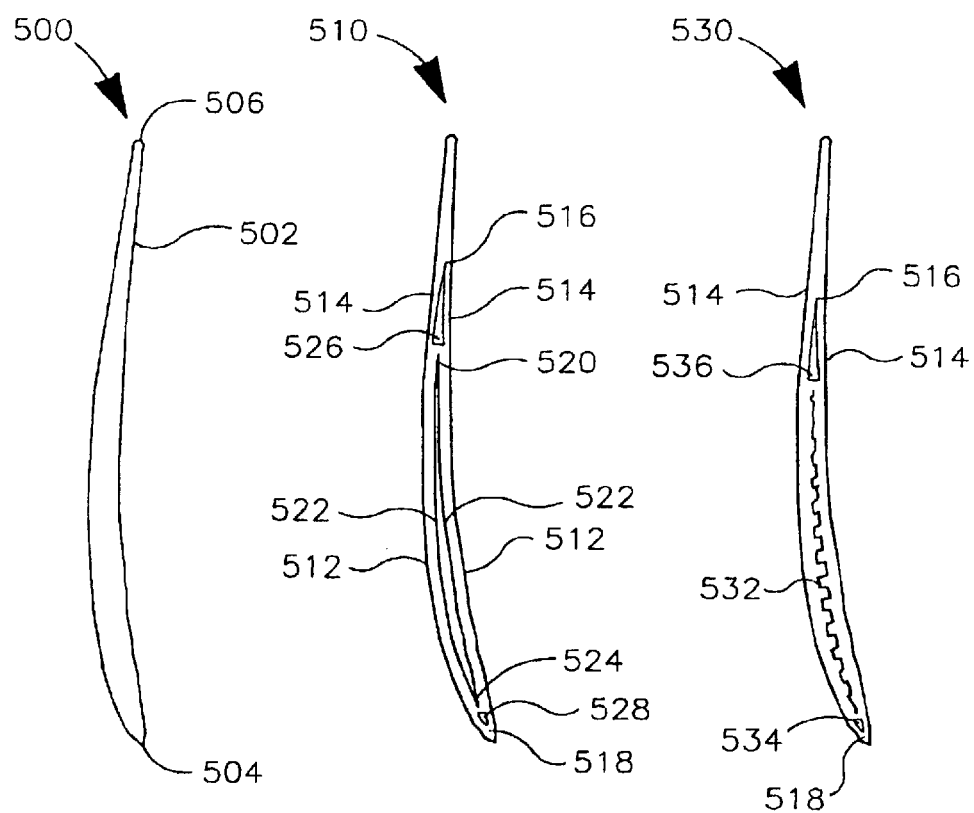
FIG. 10A is a top, cross-sectional view of an outer perimeter design for a blade, used by FIGS. 10B, 10C, 11A, and 11B, having an upper outer vertex, and a lower outer vertex.
FIG. 10B is a top, cross-sectional view through a single layer of a prior art object formed by an outer contour bead deposited along an outer contour tool path and an inner contour bead deposited along an inner contour tool path, having internal voids formed due to the distance between the inner and outer tool path vertices.
FIG. 10C is a top, cross-sectional view through a single layer of a prior art object formed by an outer contour bead deposited along an outer contour tool path, and an inner raster bead deposited along an inner raster tool path within an inner contour boundary, having voids formed due to the distance of the outer tool path vertex and the inner contour boundary.

FIGS. 10A through 10C illustrate another aspect of the invention, related to the aspect illustrated in FIGS. 9A through 9C. FIG. 10A illustrates an outer perimeter 502 of a part design 500 which can be used as an air foil or turbine blade. Outer perimeter 502 includes an upper vertex 506 and a lower vertex 504, which can be treated in a manner similar to vertex tip portion 401 of FIG. 10A. FIG. 10B illustrates the result of a conventional attempt to manufacture part design 500 using layered manufacturing. The desired outer perimeter 502 of FIG. 10A is not shown in FIG. 10B. The resulting blade 510 is formed using two contour beads laid down over two contour tool paths. There is no raster filling involved in FIG. 10B. A first outer contour tool path 512 is drawn along a boundary offset in from perimeter 502. A first contour bead 514 is laid down along tool path 512. As a result of bead 514 coming together, an upper, inner vertex 516, and a lower, inner vertex 518 is formed by the deposited contour bead. In order to form a second contour bead within first contour bead 514, a second boundary is offset inward from the inner edge of bead 514, with the second boundary used as a tool path for a second contour tool path 522 which has an upper vertex 520 and a lower vertex 524. Upper vertex 520 is further than the offset distance from upper inner vertex 516, causing an upper internal void 526 to be formed. Lower vertex 524 is further than the offset distance from lower inner vertex 518, causing a lower internal void 528 to be formed. The voids thus formed can weaken blade 510.

FIG. 10C illustrates a blade 530 formed using a combination of contour tool paths and a raster tool path within the contour tool path. FIG. 10C includes the same contour bead 514, upper inner vertex 516, and lower inner vertex 518, as in FIG. 10B. The inner surface of contour bead 514 forms a space to be filled as in FIG. 10B, with the filling being accomplished using a raster tool path 532 rather than a second inner contour tool path. The raster tool path may be seen to form a zigzag pattern through the space to be filled. The raster filling is performed within the same boundary as established for FIG. 10B, a boundary offset inward about one expected bead width from the outer contour tool path. This boundary is further than half a bead width from the upper vertex 516 and the lower vertex 518, forming a boundary which keeps raster tool path 532 further than half a bead width from the inner surface of the contour bead near the upper and lower inner vertices. This results in voids 534 and 536.

FIGS. 10A through 10C illustrate a problem which Applicants believe may be solved in a manner similar to the problem illustrated in FIG. 9A. In FIG. 9A, the original tool path is located further than one offset from the outer perimeter vertex, leading to an under-defined perimeter vertex for that part. In FIGS. 10B and 10C, the original inner boundary, which is offset inward from the outer contour bead, is located further than one offset from the inner surface of the outer contour bead. In both cases, an inner boundary ends in a vertex which does not extend to within half a bead width of the desired point, leaving an under-defined outer perimeter vertex in FIG. 9A, and internal voids in FIGS. 10B and 10C. In FIG. 10B, the inner boundary is used to define the limits of travel for an inner contour tool path. In FIG. 10C, the inner boundary is used to define the limits of travel for an inner raster tool path. In both cases, the limits to travel conflict with design intent of having no internal voids.

Figure 11B:
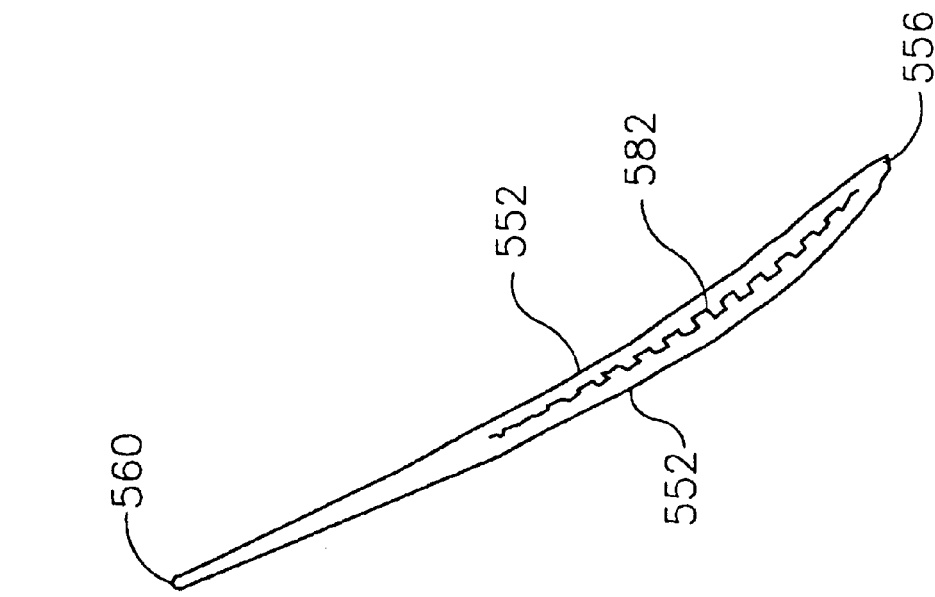
FIG. 11B is a top, cross-sectional view through a single layer of an object formed by an outer contour bead deposited along an outer contour tool path, and an inner raster bead deposited along an inner raster tool path within an inner contour boundary, having the inner contour boundary vertices relocated closer to the outer tool path vertices.
Figure 11A:
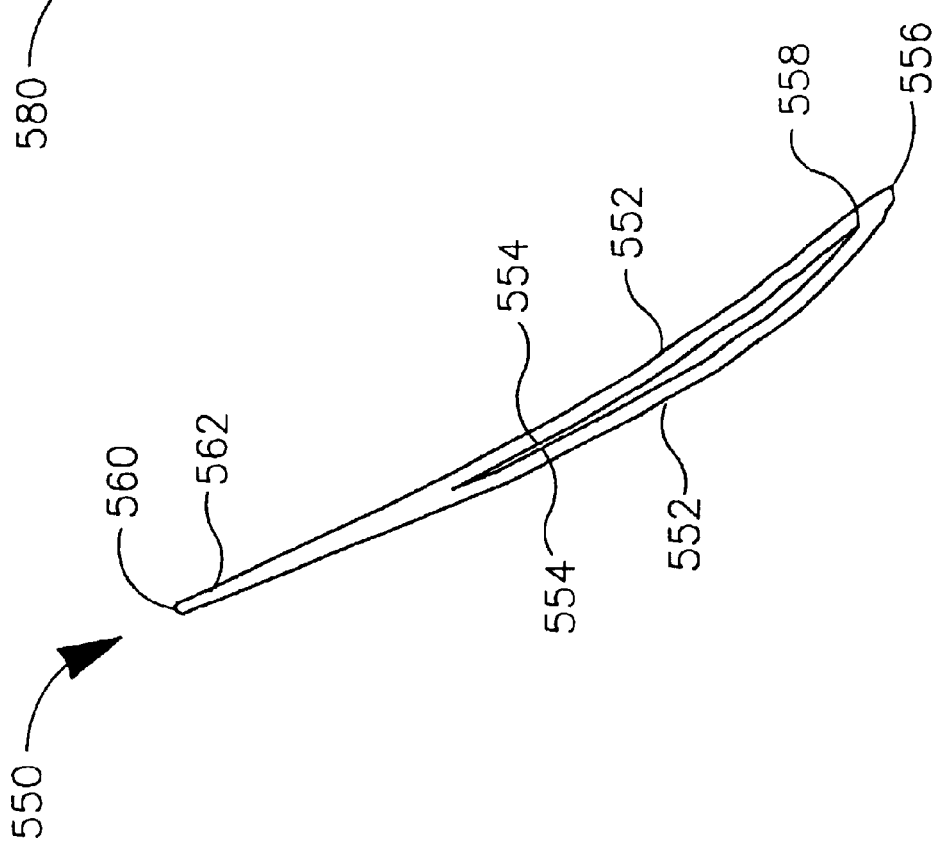
FIG. 11A is a top, cross-sectional view through a single layer of an object formed by an outer contour bead deposited along an outer contour tool path, and an inner contour bead deposited along an inner contour tool path, having the inner tool path vertices relocated closer to the outer tool path vertices.

FIG. 11A illustrates a blade 550 formed using a contour jogging aspect of the present invention. Blade 550 is formed with the goal of creating a part having an outer surface substantially matching outer perimeter 502 of FIG. 10A, with outer perimeter 502 not shown in FIG. 11A. An outer contour tool path 552 is illustrated, terminating in a lower vertex 556 and an upper vertex 562. An inner contour tool path 554 is illustrated, terminating in a lower vertex 558 and an upper vertex 562. Inner contour tool path 554 is drawn along an inner boundary, offset inward about one expected bead width from outer contour tool path 552. In FIG. 11A, this inner boundary is used as a contour tool path. FIG. 11A differs in one respect from FIG. 10B in that the lower and upper vertices of the inner boundary, or inner contour tool path, have been moved outward toward the vertices of outer contour tool path 552. Moving the vertices has the effect of reducing or eliminating the internal voids present in FIG. 10B. The vertices can be moved using the method illustrated and discussed with respect to FIGS. 9A–9C.

FIG. 11B illustrates another blade 580 which can be formed using the same outer contour tool path 552 and the same outer contour tool path vertices 556 and 560 of FIG. 11A. Blade 580 may also utilize the same inner boundary, corresponding to inner tool path 554 of FIG. 11A. Blade 580 differs in that the inner boundary (not shown in FIG. 11B) is used as the travel limit for a raster tool path 582, rather than as an inner contour tool path. The inner boundary is used to limit travel of raster tool path 582 to no closer than about one expected bead width, between tool paths, or about one half the expected bead width, between raster tool path and inside surface of the outer contour bead. As can be seen from FIG. 11B, the internal voids have been eliminated. Both FIGS. 11A and 11B represent outputs from working embodiments of the present invention.

FIG. 12A illustrates a conventional method for generating raster tool paths for raster filling a layer portion 600 having a design outer perimeter 602, design inner perimeter 604, and design void 606. The outer perimeter is used to create an outer contour boundary 610, as shown in FIG. 12B, that is offset inward by about half of the relevant bead width. An inner boundary 618 is also created at an offset from inner perimeter 604, to prevent the raster tool path from coming closer than about half a bead width from the desired void to be formed. A conventional outer boundary would be a rectangle 610 disposed within outer perimeter 602. One corner of the outer boundary can be selected as an origin 612. A series of parallel raster guide lines 614 may be drawn through outer boundary 610 to be used as guides for creating the raster tool paths. Parallel lines 614 may be drawn at an angle relative to any part of the layer. In FIG. 12B, guide lines 614 are drawn at about a 45-degree angle relative to the sides of perimeter 602. Guide lines 614 may be virtual lines, either calculated within a computer and never plotted or even determined on the fly, during raster tool path calculation, with the lines never being formally calculated as lines. Guide lines in the present invention may be viewed as virtual lines parallel to a first axis, which are spaced from each other at about twice the expected bead width, along a second axis perpendicular to the first axis.

Referring again to FIG. 12A, the conventional tool path is generated from origin 612 along a first segment 620. First segment 620 may be viewed as attempting to travel away from origin 612 in the direction dictated by guide lines 614, but being forced to travel along outer boundary 610 which limits the vertical travel to the outer boundary along this segment. Travel continues until the next guide line 614 is intersected at 615, at which time the guide line is traveled away from the outer boundary. Travel continues along the guide line until another outer boundary is intersected at 617, at which time travel attempts to continue in the same direction, but is forced to travel the limiting outer boundary until the next line 614 is intersected. At a point 624, inner boundary 618 is intersected, and the tool path goes along inner boundary 618 until another guide line 614 is intersected at a point 626. In the conventional method, at inner boundary 618, the tool path attempts to travel the inner boundary away from the origin. This choice can create a sparsely filled region 628, where little or no material will be deposited. The tool path continues using similar logic, until eventually a terminus 630 is reached.

Numerous sparse regions 632, 634, 636, 638, and 640 are indicated on FIG. 12A. A shadow zone 642 is illustrated "behind" void 606 relative to the tool path between points 624 and 626, as a result of the tool path travelling around the void, thereby not initially filling in the shadow zone 642, which is filled in with a separate tool path 644 later.

FIG. 13 illustrates an improved method, which may utilize parts of the conventional method, previously described. After beginning at origin 612, the tool path travels segment 620 as in FIG. 12A, but travels differently than the conventional method when encountering an inner boundary, such as inner boundary 618. When intersecting an inner boundary, if the intersection is the first intersection for this inner boundary, then the tool path attempts to continue along the line as before, but travelling the inner boundary 618 in a direction initially toward the origin. In FIG. 13 this can correspond to continuing with the same travel direction previously traveled along the guide line, but limited to travel inner boundary 618 by travelling toward the origin, which requires going over the top of inner boundary 618. If the intersection with an inner boundary is not the first intersection for that boundary, then, in one embodiment of the invention, the tool path attempts to continue along the same direction, but travelling the inner boundary in a direction that initially takes the tool path away from the origin. If the inner boundary is relatively large, then this portion of the tool path will next intersect with a guide line 614 and the direction traveled along line 614 reversed, creating a shadow zone on the other side of the inner boundary. If the inner boundary is relatively small, as in FIG. 13, then this portion of the tool path continues until the most recently traveled guide line 614 is re-acquired, and the tool path continues in the same direction as previously traveled along this guide line. This guide line will normally be the next guide line intersected by the inner boundary. In FIG. 13, an overfilled region 648 is created, as the tool path comes closer than desired to the next guide line 614 and the next tool path drawn along this line.

There are other variations of this embodiment and various ways to describe the embodiments and methods. In one variation, the layer portion to be raster filled can be tilted at a selected angle, such that guide lines 614 may be viewed as extending right to left, or up to down. In the general case, a first axis may be selected which can determine a second axis orientation orthogonal to the first axis. The first axis can be a right-left axis and the second axis an up-down axis. Lines 614 can be drawn along one of these axes. In one method, the layer portion is tilted such that the origin is at the top, at a 12 o'clock position, with lines 614 drawn along the right-left axis. Viewed in this way, one embodiment of the present invention may be described with respect to FIG. 13.

FIG. 13 may be rotated such that origin 612 is rotated to the top, 12 o'clock position, and the raster tool path can initially set to travel down, but limited by outer boundary 610. In FIG. 13, the raster tool path travels initially to one of the opposite right-left directions, in this case the right direction. When hitting the first guide line 614 at point 615, the right-left direction reverses. When outer boundary 610 is hit again, at point 617, travel continues downward along boundary 610 until another guide line 614 is hit, at which time travel continues in the reverse right-left direction. When an inner boundary is hit, if it is the first time this inner boundary has been hit, the tool path travels over the top of the inner boundary. If it is the last time the inner boundary will be hit, the tool path travels under the inner boundary. If this is neither the first nor the last time the inner boundary will be hit, travel continues downward along the inner boundary until the next guide line 614 is hit, at which time the tool path travels along the right-left 614 guide line in the reverse right-left direction as the last portion of right-left travel. This later described travel can create shadow zones, which may be filled in later with additional tool paths.

Figure 14:
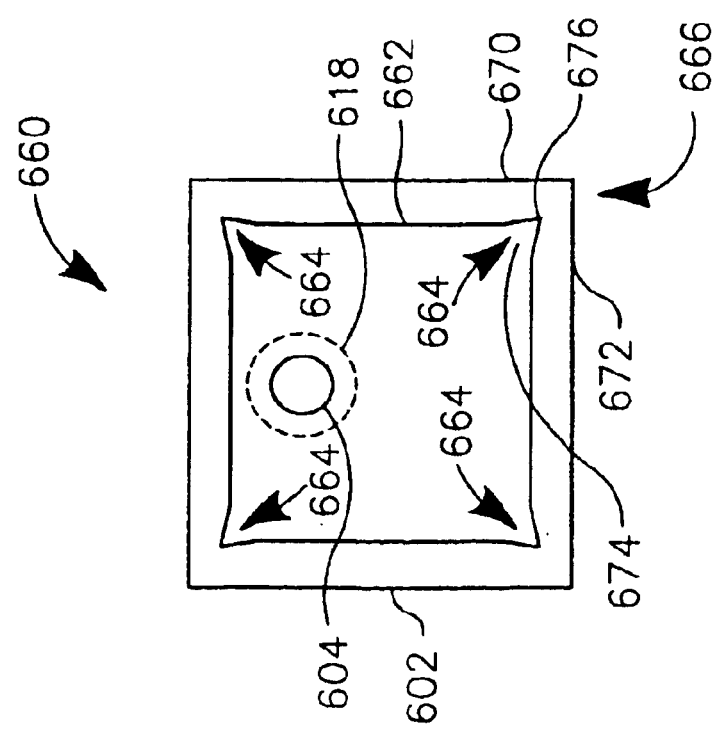
FIG. 14 is a top, cross-sectional view of an outer offset boundary having better positioned vertices, generated for use in forming the tool paths of FIGS. 15 and 16.

FIG. 14 illustrates yet another aspect of the invention, similar in some respects, but not in others, to the method described with respect to FIG. 12B. Layer portion 660 can be initially formed by "jogging" outer boundary 662 at corners 664 to bring outer boundary 662 closer to design perimeter 602 near the corners. One method for jogging outer boundary 662 uses the methods previously described for moving boundary vertices, as discussed with respect to FIGS. 9A–9C. Inspection of FIG. 14 shows outer perimeter 602 having a vertex portion 666 disposed between a first leg 670 and a second leg portion 672. Outer boundary 662 includes a vertex portion 674 having a vertex tip 676 disposed between two vertex leg portions. Outer boundary vertex tip 676 may be drawn closer to perimeter 602, for example, to within about half the expected bead width.

Figure 15:
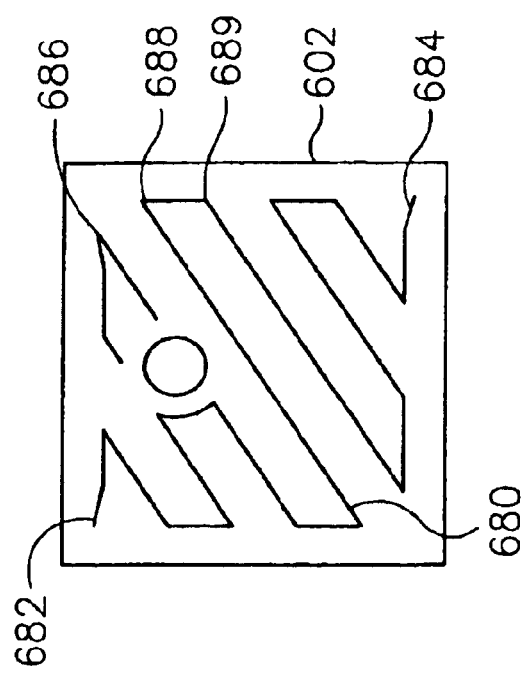
FIG. 15 is a top, cross-sectional view of a tool path generated to produce a layer portion having a square outer perimeter and round inner perimeter, the raster tool path being drawn within the outer boundary of FIG. 14, and having improved filling near the outer perimeter.

FIG. 15 illustrates a tool path 680 resulting from the outer boundary vertex relocation of FIG. 14. A new origin 682 may be seen to extend to the new outer boundary vertex position, as well as the new terminus 684, which also extends closer to the outer perimeter. The guide lines for the raster tool paths such as lines 614 of FIG. 12B, also extend closer to the corners, as can be seen at raster tool path position 686. Under filled, potentially weak locations, such as locations 640 and 638 of FIG. 13, may be eliminated by adjusting the outer boundary vertex locations.

As prelude to another aspect of the invention, the shape of the raster tool path vertices near the outer boundary may now be discussed with respect to FIGS. 14 and 15. Raster tool path 680 may be seen to intersect outer boundary 662, forming corners having straight legs on either side. In one example, near corners 688 and 689, the raster path vertex leg portions either parallel the raster tool path straight portions, or parallel the outer boundary. In this respect, the vertices are similar to the conventional raster tool path corners illustrated in FIG. 12A.

Figure 16:
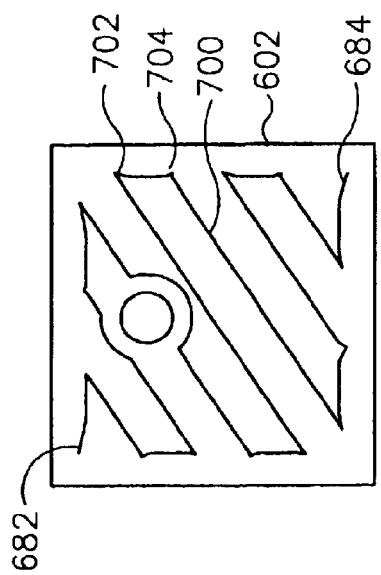
FIG. 16 is a top, cross-sectional view of a tool path generated to produce a layer portion having a square outer perimeter and round inner perimeter, the raster tool path drawn within the outer boundary of FIG. 14, and having relocated or better positioned raster tool path perimeter vertices, providing improved filling near the outer perimeter and inner perimeter.

FIG. 16 illustrates another aspect of the present invention in tool path 700. Tool path 700 results from having the outer boundary vertices relocated as in FIG. 16. Tool path 700 also has raster tool path vertices 702 and 704, which correspond to conventional corners 688 and 689 of FIG. 15. Vertices 702 and 704 may be said to be dog-eared, with the vertices drawn closer to perimeter 602, and also drawn closer to the pairs of raster tool paths disposed on either side. Standard vertices 688 and 689 may cause gaps to extend into the perimeter surface, as the beads are located further from the surface at the outside corner of each bead as it turns and reverses direction. See, for example, gaps 53 and 55 in FIGS. 1 and 2. Relocated vertices 702 and 704, by bringing the tool path closer to the surface and to the bead pairs on either side, can reduce or eliminate the surface gaps. In embodiments having an outer contour bead, relocated vertices 702 and 704 can reduce or eliminate the sub-perimeter voids formed between the raster bead pair ends and the contour bead they abut.

Figure 17:
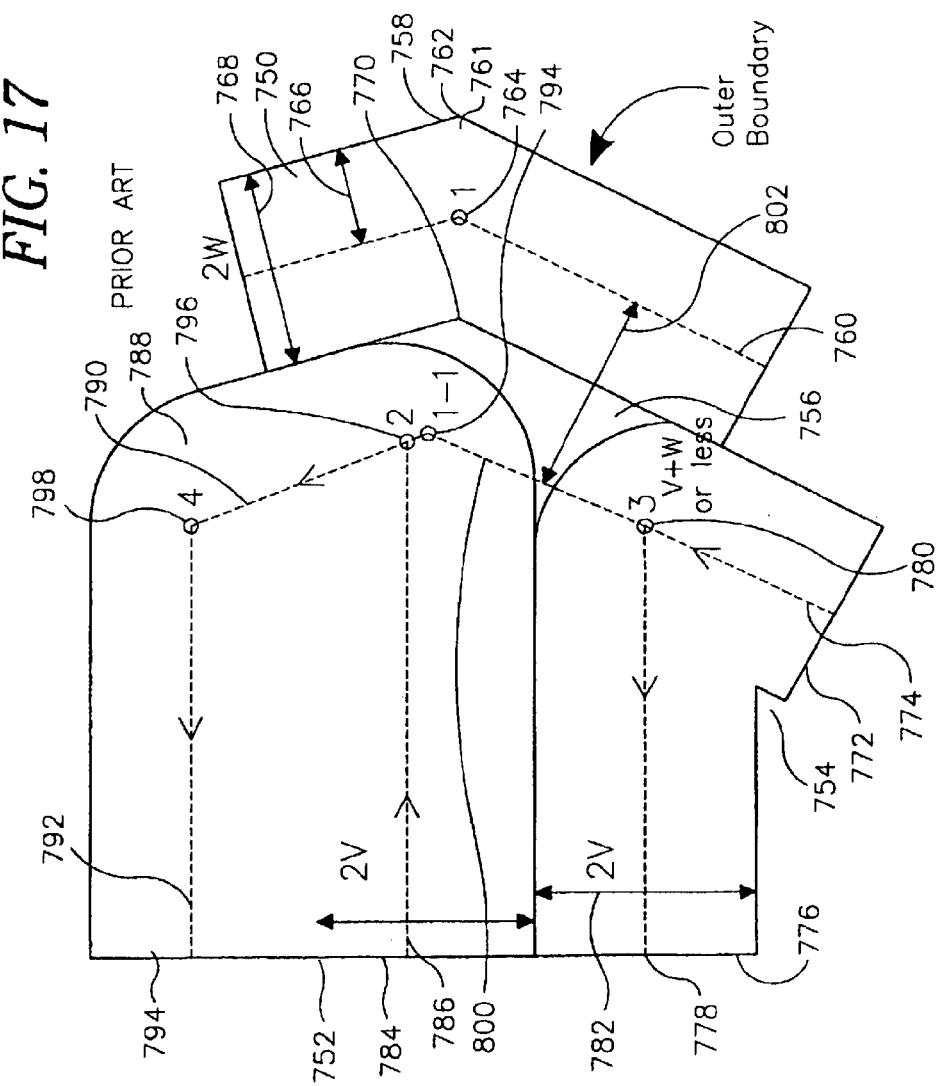
FIG. 17 is a fragmentary, top view of an outer contour bead abutted by two raster bead pairs formed of raster segments joined at raster vertices, illustrating a sub-perimeter void between the raster bead pairs, and between the raster bead pairs and the contour bead.

In FIGS. 17–21, similarly numbered points may be compared between figures. FIG. 17 illustrates an outer contour bead 750 abutted by a first raster bead pair 754 and a second raster bead pair 752, illustrating a conventional subperimeter void 756 between raster bead pairs 754 and 756, and between raster bead pairs 754 and 756 and contour bead 750. Contour bead 750 is deposited within an outer perimeter 758, an along a tool path center line 760. Outer perimeter 758 has an outer perimeter vertex point 762, and an under-filled vertex region 761. Contour bead 750 has a bead width, "2W" indicated at 768, and an offset of half a bead width, "W", indicated at 766. Tool path 760 has a tool path vertex point 764, and contour bead 750 has an interior bead surface vertex point 770, later to be referred to as a locator point. Tool path vertex point 764 may be created by inwardly offsetting outer perimeter vertex point 762 by about a distance W. Bead pair 754 includes a turnaround bead 772 deposited along a turnaround tool path segment 774, and an inbound bead segment 776 deposited along an inbound tool path segment 778. Tool path segments 774 and 778 intersect at a tool path vertex point 780. Raster beads 772 and 776 have a bead width of "2V", indicated at 782, and an offset of half a bead width, or "V." The bead widths and tool path offsets for the raster beads and contour beads can be different, with the differences supported by the present invention. Bead pair 752 includes an inbound bead 784 deposited along an inbound raster tool path segment 786, a turnaround bead segment 788, deposited along a turnaround raster tool path segment 790, and an outbound bead 794, deposited along an outbound raster tool path segment 792.

Raster tool paths 786 and 790 meet at raster tool path vertex 796, and raster tool paths 790 and 792 meet at a raster tool path vertex 798. An outer boundary line 800 may be created by inwardly offsetting outer perimeter tool path 760 by a distance of about V+W or less, indicated at 802. An outer boundary vertex point 794 may be created by inwardly offsetting tool path 760 and point 764. Outer boundary 800 may be seen to serve as a limit to travel to raster beads 778, 784, and 794, and as a contour tool path for bead segments 772 and 788. Points 780, 796, and 798 may be created by the formation of parallel raster guide lines which intersect outer boundary 800 at these point locations.

Figure 18:
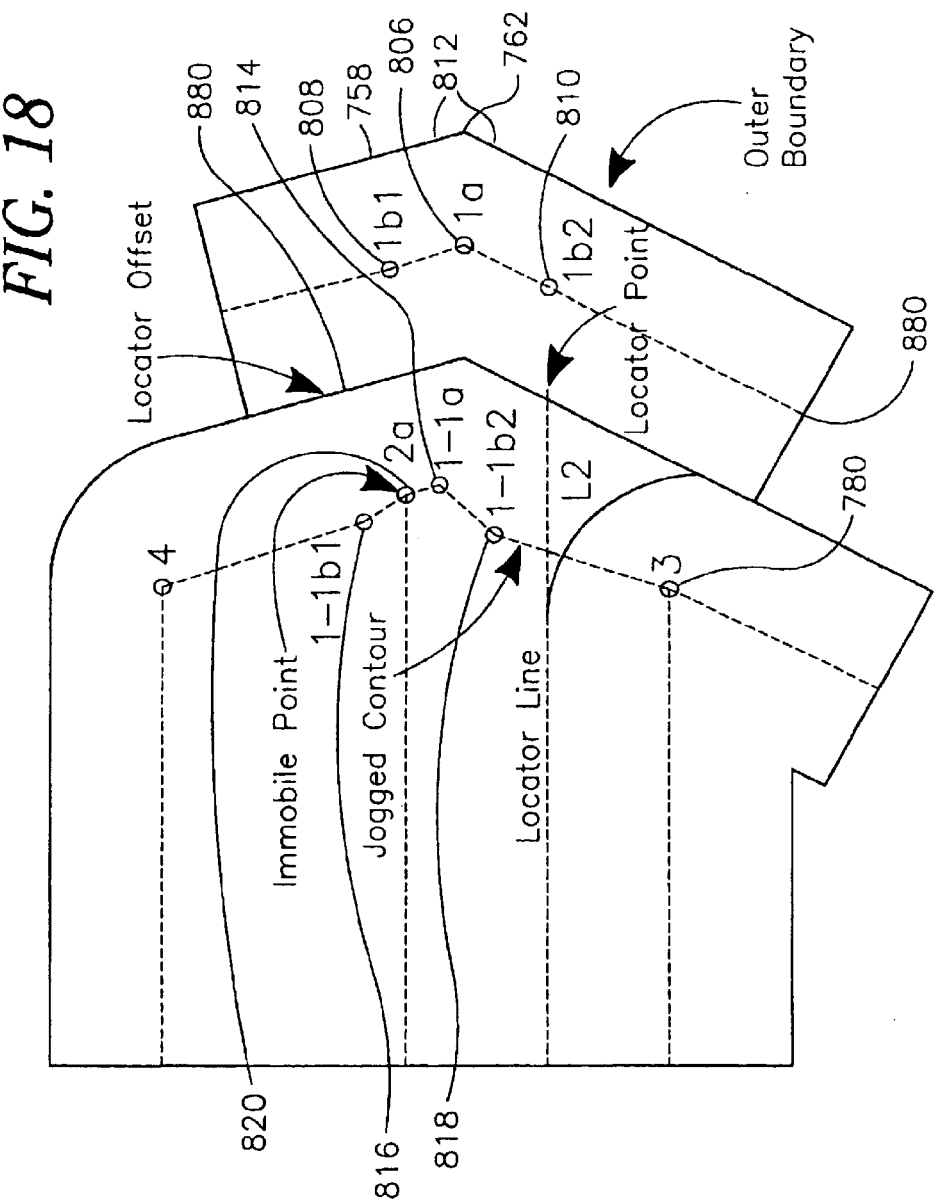
FIG. 18 is a fragmentary, top view of the beads of FIG. 17, after partial execution of a method including jogging or relocation of the contour tool path vertices.

FIG. 18 illustrates the result of part of a method in which the outer perimeter vertex has been relocated or positioned outward. Outer perimeter 758, reflecting the design intent, remains unchanged. Outer tool path vertex 764 has been relocated or replaced by a new outer tool path vertex 806. Tool path vertex 806 can be positioned using methods previously discussed with respect to FIGS. 9A–9C. In the example illustrated, a pair of tool path vertex base pair points 808 and 810 may be seen, and can be selected as previously discussed, to assist in moving point 764 to point 806. Overfilling near either side of vertex 762 may be observed at 812. In one embodiment, point 806 is moved to about a distance W from vertex point 762:

Outer boundary vertex point 794 of FIG. 17, offset from vertex point 764 of FIG. 17, may be relocated as well, to new vertex point 814 in FIG. 18, using vertex relocating methods previously discussed. FIG. 18 illustrates use of two vertex base points 816 and 818, which can be used to assist in relocating point 794 to 814. New vertex point 814 can be moved to a distance of about V+W or less from vertex point 806. Methods of moving an inner vertex to be closer to a more outer vertex was previously discussed with respect to the blade of FIGS. 11A and 11B. Part of void 756 of FIG. 17 has disappeared as a result in FIG. 18. Point 796 of FIG. 17, which may be originally created by the intersection of a raster guide line with outer boundary 800, has been moved to a new immobile point 820, which can be created by the intersection of a raster guide line with the moved outer boundary. Immobile point 820 is now located on a jogged contour, and can be marked to indicate that it is not to be further moved.

Figure 19:
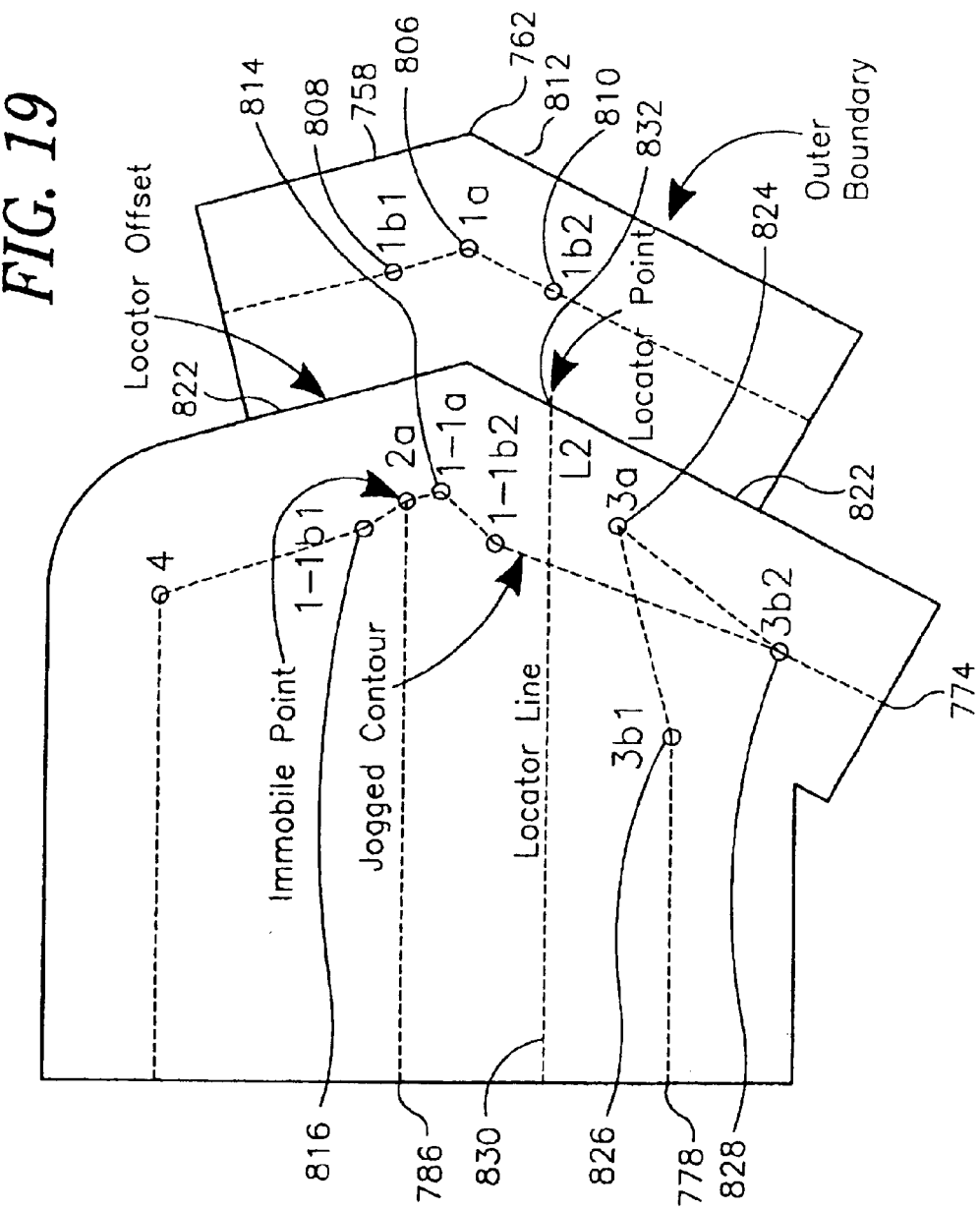
FIG. 19 is a fragmentary, top view of the beads of FIG. 18, after completion of the method of FIG. 18, showing elimination or reduction of sub-perimeter voids by improved positioning of the raster vertices.

FIG. 19 illustrates further processing of the result of FIG. 18, including the relocation of vertex 780 of FIG. 18 to a new vertex point 824, now part of a vertex having a pair of base points 826 and 828. A locator offset line 822 may be seen to be offset inward about a distance 2W, one bead width, from outer perimeter 758. A locator line 830 may be seen to extend between the two raster tool path segments 778 and 786, offset by about a distance V. A locator point 832 may be seen at the intersection of locator offset 822 and locator line 830. Locator point 832 is used to relocate vertex 780 to point 824, using methods previously discussed. Most of void 756 of FIG. 17 has been eliminated in FIG. 19.

Figure 20:
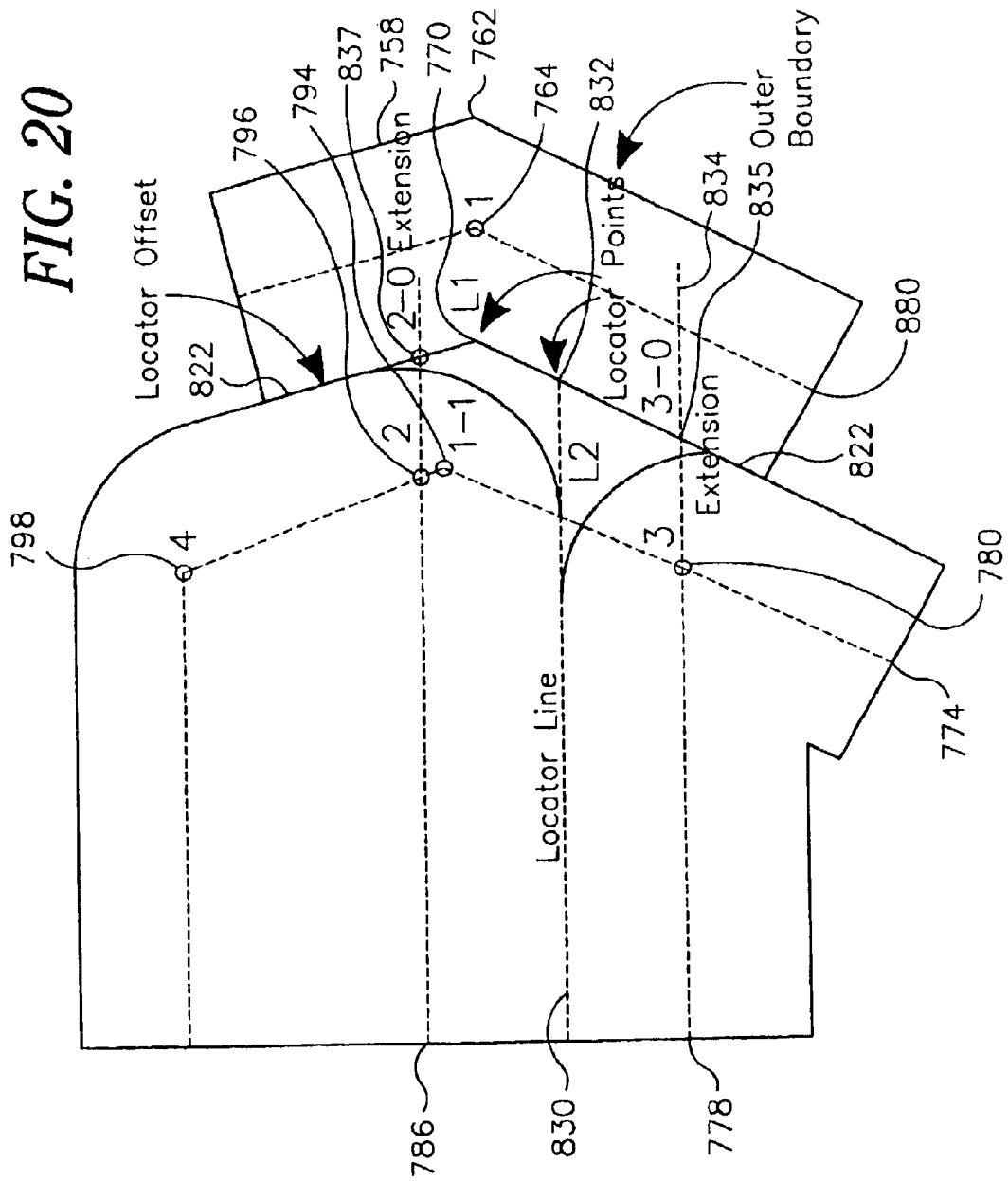
FIG. 20 is a fragmentary, top view of the beads of FIG. 17, after partial execution of a method not including jogging or relocation of the contour tool path vertices.

FIG. 20 illustrates a method for dog-earing rasters not utilizing contour jogging. A first extension line 834 may be seen to extend along a raster guide line or raster tool path, intersecting locator offset 822 at a point 835. A second extension line 836 may be seen to extend along a raster guide line or raster tool path, intersecting locator offset 822 at a point 837. A determination can be made using this method as to whether any given locator point from another vertex is to be used to relocate a particular vertex. A determination can be made as to whether any points on the locator offset exist that are between the intersection of the locator offset 822 and locator line 830, and the intersection of the locator offset 822 and the extension 834. In this case, any points between point 832 and 837 are locator points for vertex point 796. Thus, points 770 and 832 are both locator points for vertex point 796. Vertex 796 may be jogged out toward the two points 832 and 770 by averaging the points, as discussed with respect to FIG. 9C.

Any points between point 835 and 770 are locator points for vertex 780, making point 832 a locator point for vertex point 780. The locator points, virtual points, are created to allow a determination of where to relocate the vertices.

Figure 21:
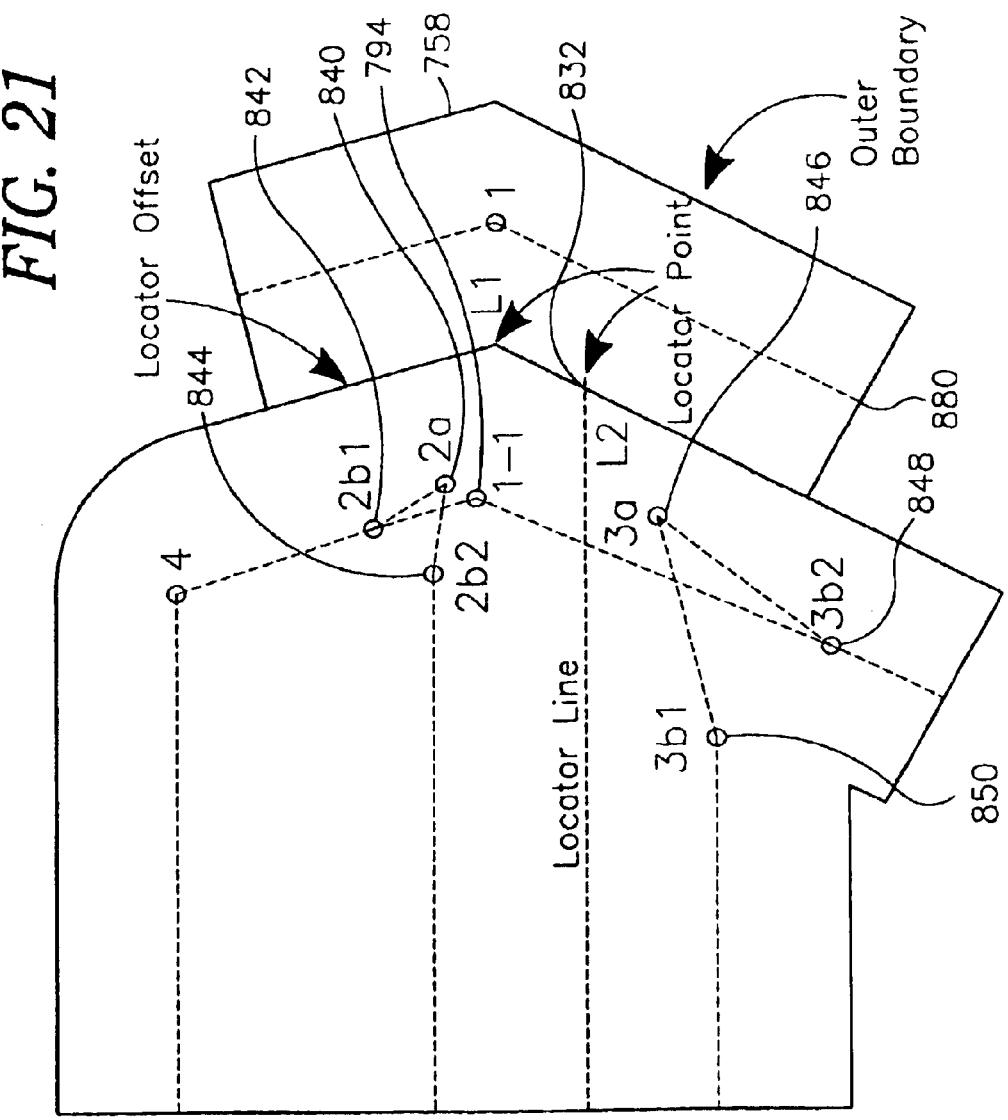
FIG. 21 is a fragmentary, top view of the beads of FIG. 20, after completion of the method of FIG. 20, showing elimination or reduction of sub-perimeter voids by improved positioning of the raster vertices.

FIG. 21 illustrates further processing of FIG. 20. Vertex 796 has been moved toward the average of points 770 and 832, and vertex 780 has been moved toward point 832. Vertex base points 842, 844, 850, and 848 have been created, as described with respect to previous vertex relocations. Void 756 of FIG. 17 has been almost totally eliminated in FIG. 21. Inspection of FIGS. 19 and 21 shows that the dog-earing of the raster tool path vertices has been automatically performed by the methods described. The new vertices 814 and 824, and 840 and 846, may be seen to pull the raster bead pairs closer together at the outside of the bead pair, and pull the bead pair outside corners out and toward the contour bead.

FIGS. 20 and 21 illustrate a method for dog-earing, or relocating raster tool path vertices, where the outer contour tool path has not been jogged, which may stated in one embodiment as follows:

(1) A contour offset line 880 or first outer boundary may be offset inward from the outer perimeter 758 by a distance, the distance can be about equal to half the expected outer contour bead width, where the bead width is 2W, and the offset is preferably less than W.

(2) A second outer boundary 822 may be offset in from the outer perimeter by the expected bead width of 2W. The resulting outer boundary may be referred to as the locator offset. Virtual points may later be disposed along this locator offset to serve in relocating raster tool path vertices.

(3) Raster tool paths 774, 778, 786, and 787 are generated, and can be drawn along parallel guide lines. The raster tool paths may be considered as pairs, with tool paths 774 and 778 forming one pair, and 786 and 787 forming a second pair. Each pair has an outbound portion and an inbound portion. The raster tool paths commonly have an expected bead width which can be represented by 2V, preferably have an offset of less than V, and are preferably spaced apart at a distance of less than about 2V. A set of locator lines is drawn, such as locator line 830, between the raster tool path pairs, and parallel and equidistant to them.

(4) The points of intersection of the locator lines and locator offset, such a point 832, can be marked.

(5) The raster points, the points at the raster vertex, for example points 780 and 796, may be identified.

(6) The raster lines, for example, lines 778 and 786, can have extension segments projected to intersect locator offset 822.

(7) For each vertex point on either side of the locator lines separating the raster pairs, a check can be made to determine whether any points on locator offset 822 exist between the intersection of the locator offset-locator line, for example, point 832, and the intersection of the locator offset and raster extension, for example, point 837. Raster vertex point 796, point 770 satisfies this test. For example, for raster vertex point 780, there is no such point. If this condition is met, then step 9 is executed, otherwise step 8 is executed.

(8) The intersection point of the locator line and the locator offset is used as a point toward which to jog the raster vertex. Thus, in a regime where rasters intersect straight lengths of contour beads, the raster vertex on each side of the locator line will be jogged inward towards each other, and outward toward the intersection of the locator line and the locator offset.

(9) The intersection point of the locator line and the locator offset is used as a point toward which to jog the raster vertex, but also is the inwardly offset perimeter vertex which lies along the locator offset, such as point 770. In one method, these two points are averaged and the average point used to jog the raster vertex outward. Thus, in a regime where the rasters, when projected, would contain between themselves a vertex on the locator offset due to a perimeter vertex, then both the intersection point of the raster extension and the inwardly offset perimeter vertex are used to jog the raster vertex.

FIGS. 18 and 19 illustrate a method for dog-earing, or relocating raster tool path vertices, where the outer contour tool path has not been jogged, which may stated in one embodiment as follows:

The contour jogging is performed as previously described, to relocate the contour tool path vertex closer to the outer perimeter vertex. The jogged contour tool path is then used to generate the rasters using methods previously described. Some of the raster vertices between the outbound and turnaround segments, or between turnaround and inbound segments, will lie on relocated or jogged tool paths. In one embodiment of the invention, the raster vertices lying on relocated tool paths will not be further moved. In this embodiment, raster vertices not lying on jogged tool paths will be treated as described with respect to FIGS. 20 and 21.

Methods described above with respect the present invention can be implemented on a computer using any suitable programming language. Suitable languages include, without limitation, Fortran, C, C++, Java, BASIC, and Pascal. The methods can operate on a CAD file containing a representation of an object to be manufactured, and can output data files describing curves to be filled in, and tool paths to be followed to fill in the curves. The present invention explicitly includes computer programs inputting and outputting data, where the output data will ultimately be used to drive layered manufacturing tools. The invention specifically includes within its scope programs, and devices executing these programs, for accepting existing tool paths as input, and generating improved tool paths as output. The computer programs can exist as human readable source code and/or as compiled and ready to execute machine code. The computer programs can reside on machine readable media, including magnetic and optical discs. The methods described herein can be used to generate tool paths for use in layered manufacturing. The methods and tool paths generated by these methods are explicitly within the scope of the invention. Also within the scope of the invention are products made by processes according to the present invention.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for generating additive tool paths to form a convex layer portion by layered manufacturing, wherein said convex layer portion has a outer perimeter defined by a perimeter first leg portion coupled to a perimeter vertex portion coupled to a perimeter second leg portion, wherein said perimeter vertex portion has a perimeter vertex tip portion, wherein said tool path has an associated tool path width, the method comprising the steps of:

generating said tool path within said convex layer portion, such that said tool path has a tool path first leg portion disposed at about said offset distance from said perimeter first leg portion and coupled to a tool path vertex portion, said vertex tool path portion having a tool path vertex tip portion disposed at about said offset distance from said perimeter vertex tip portion and coupled to a tool path second leg portion, said tool path second leg portion being disposed at about said offset distance from said perimeter second leg portion.

2. A method for generating additive tool paths as in claim 1, wherein said tool path generating step includes forming a curved tool path vertex portion.

3. A method for generating additive tool paths as in claim 1, wherein said tool path generating step includes generating an initial tool path vertex portion having an initial tool path vertex tip portion disposed at a distance greater then said offset distance from said perimeter vertex tip portion, wherein said tool path generating step includes moving said initial tool path vertex tip portion closer to said perimeter vertex tip portion to form said tool path vertex tip portion.

4. A method for generating additive tool paths as in claim 3, wherein said moving step includes moving said initial tool path vertex tip portion to a distance of about said tool path width from said perimeter vertex tip portion.

5. A method for generating additive tool paths as in claim 4, wherein said tool path generating step includes generating a tool path vertex portion first leg disposed between said tool path first leg and said tool path vertex tip portion, wherein said tool path generating step includes generating a tool path vertex portion second leg disposed between said tool path second leg and said tool path vertex tip portion, wherein said tool path generating step includes generating said first and second tool path vertex legs at a closest distance of about one tool path width from said perimeter vertex portion.

6. A method for layered manufacturing performed by forming material having a bead width along a tool path, the method comprising: automatically adjusting a tool path vertex to be close to an outer perimeter vertex by automatically disposing the tool path vertex a distance at about half the bead width from the perimeter vertex, including bringing regions on either side of the tool path vertex closer than about half the bead width to corresponding perimeter vertex regions.

7. A part having a convex portion made by a layered manufacturing process comprising forming at least two nested material beads, each bead having a vertex, such that said bead vertices have no voids therebetween.

8. A part made by a process as in claim 7, wherein said bead vertices are formed at a center-to-center distance therebetween of about one bead width.

9. A part made by a process as in claim 7, wherein said convex portion forms an interior angle of less than about seventy degrees (70°).

10. A part made by a process as in claim 7, wherein said convex portion forms an interior angle of less than about forty degrees (40°).

11. A method for generating at least one tool path within a layer region for layered manufacturing, wherein said layer region includes a material region disposed within an outer perimeter, wherein said tool path has an associated offset distance, the method comprising the steps of:
offsetting said outer perimeter inward toward said material region by about said tool path offset to form a first outer boundary;
identifying at least one outer perimeter vertex;
identifying a first outer boundary vertex on said first outer boundary derived from said outer perimeter vertex;
relocating said first outer boundary vertex from an original position to a relocated position disposed closer to said outer perimeter vertex than said original position, such that said first outer boundary is modified by being moved closer to said outer perimeter vertex; and
generating at least one tool path within said relocated first outer boundary.

12. A method for generating at least one tool path as in claim 11, wherein said tool path generated is a raster tool path generated within said relocated first outer boundary.

13. A method for generating at least one tool path as in claim 11, wherein said tool path generated is a contour tool path generated along said relocated first outer boundary.

14. A method for generating at least one tool path as in claim 11, wherein said first outer boundary vertex identifying step includes identifying a first outer boundary vertex tip point and selecting at least one outer boundary base point on either side of said first outer boundary vertex tip point, wherein said identifying outer perimeter step includes identifying an outer perimeter vertex tip point, further comprising relocating said outer boundary vertex tip point toward said outer perimeter vertex tip point, and relocating said outer boundary vertex to extend between said first outer boundary vertex base points and said relocated first outer boundary vertex tip point.

15. A method for generating at least one tool path as in claim 14, wherein said identified outer perimeter vertex tip point is a virtual point formed from an average of at least two outer perimeter points.

16. A method for generating at least one tool path as in claim 11, further comprising
offsetting said relocated first outer boundary inward toward said material region by about said tool path offset to form a second outer boundary including a second outer boundary vertex having an original position;
identifying at least one second outer boundary vertex;
identifying a second outer boundary vertex on said second outer boundary derived from said first outer boundary vertex;
relocating said second outer boundary vertex from said original position to a relocated position disposed closer to said first outer boundary vertex than said original position, such that said second outer boundary is modified by being moved closer to said first outer boundary vertex; and
generating at least one inner tool path within said relocated second outer boundary.

17. A method for generating at least one tool path as in claim 16, wherein said inner tool path generated is an inner raster tool path generated within said relocated second outer boundary.

18. A method for generating at least one tool path as in claim 16, wherein said inner tool path generated is an inner contour tool path generated along said relocated second outer boundary.

19. A method for generating at least one tool path as in claim 11, wherein said first outer boundary vertex is moved to about one offset distance from said outer perimeter vertex.

20. A method for generating at least one tool path portion within a layer region for layered manufacturing, wherein the layer region has at least a first outer perimeter portion and a second outer perimeter portion meeting at an angle of less than 180 degrees to each other at an outer perimeter vertex, wherein said layer region has a material portion between said first and second perimeter portions, wherein said tool path has an associated offset corresponding to about half of an associated tool path bead width, wherein said tool path offset and first perimeter define a first outer boundary first leg substantially parallel to said first perimeter and disposed in said material portion, wherein said tool path offset and said second perimeter define a first outer boundary second leg substantially parallel to said second perimeter and disposed in said material portion, wherein said first outer boundary first leg and first outer boundary second leg intersect at a first outer boundary vertex, wherein the method comprises the steps of:
generating a modified first outer boundary vertex point which lies between said perimeter vertex point and said first outer boundary vertex point;
generating a first leg tool path portion along a portion of said first outer boundary first leg;
generating a second leg tool path portion along a portion of said first outer boundary second leg;
generating a third tool path portion extending from said first leg tool path portion to said modified first outer boundary vertex point; and
generating a fourth tool path portion extending from said modified first outer boundary vertex point and extending to said second leg tool path portion, such that said tool path extends nearer said perimeter vertex at said modified first outer boundary vertex point than at said first outer boundary vertex point.

21. A method as in claim 20, wherein said third and fourth tool path generation steps include generating arcuate tool paths.

22. A method as in claim 20, wherein said third and fourth tool path generation steps include generating substantially straight tool paths.

23. A method as in claim 20, wherein said first and second tool path generation steps include generating tool paths no closer than about one offset distance from said perimeter at distances of more than about four offset distances from said perimeter vertex.

24. A method for generating at least one tool path within a layer region for layered manufacturing, wherein said layer region has at least a first contour tool path first leg and a first contour tool path second leg, wherein said first contour tool path first and second legs, when extended, meet at an internal angle of less than 180 degrees at a first contour tool path vertex, wherein said layer has a material portion between said first contour tool path first and second legs, wherein said tool path has an associated offset corresponding to about half of an associated tool path bead width, wherein said tool path offset and first contour tool path first leg define a first contour boundary first leg parallel to said first contour tool path first leg and disposed in said material portion, wherein said tool path and said first contour tool path second leg define a first contour boundary second leg parallel to said first contour tool path second leg and disposed in said material portion, wherein said first contour boundary first and second legs intersect at a first internal boundary vertex, wherein the method comprises the steps of:

generating a modified internal vertex point which lies between said contour tool path vertex point and said first boundary vertex point;

generating a first tool path leg portion along a portion of said first contour boundary first leg;

generating a second tool path leg portion along a portion of said first contour boundary second leg;

generating a third tool path portion extending from said first tool path leg portion to said modified internal vertex point; and generating a fourth tool path portion extending from said modified internal vertex point and extending to said second tool path leg portion, such that said tool path extends nearer said contour vertex point than said first boundary vertex point.

25. A method as in claim 24, wherein said third and fourth tool path generation steps include generating arcuate tool paths.

26. A method as in claim 24, wherein said third and fourth tool path generation steps include generating substantially straight tool paths.

27. A method as in claim 24, wherein said first and second tool path generation steps include generating tool paths no closer than about 2 offsets distance from said contour intersection point.

28. A method for generating an additive tool path to form a perimeter vertex by layered manufacturing, wherein the tool path has an associated tool path offset, the method comprising the steps of:

obtaining a first data representation of said perimeter vertex;

obtaining a second data representation of a first tool path offset inward from said perimeter vertex;

identifying at least one perimeter point on a tip of said perimeter vertex;

selecting a first tool path point from said second data representation that was offset inward from said perimeter vertex tip point; and moving said first tool path point toward said perimeter vertex point, such that said first tool path point is located closer to said perimeter vertex point.

29. A method for generating an additive tool path as in claim 28, wherein said moving step includes moving said first tool path point to a distance of about one offset from said perimeter vertex point.

30. A part made according to a part design by a layered manufacturing technique, the part design having at least one layer having an outer perimeter vertex portion disposed between a perimeter first leg and a perimeter second leg, said outer perimeter vertex portion having an interior angle of less than about 150 degrees, the outer perimeter defining a material portion and a non-material portion, the process for forming said layer comprising the step of:

forming a first material bead offset into said material portion from said perimeter first leg, perimeter vertex portion, and perimeter second leg, wherein said first bead has a first leg offset inward by about an offset distance from said perimeter first leg, wherein said first bead has a second leg offset inward by about said offset distance from said perimeter second leg, wherein said perimeter vertex portion has a perimeter vertex tip, wherein said first bead has a first bead vertex tip, said first bead vertex tip being disposed at about said offset distance inward from said outer perimeter vertex tip.

31. A part made according to a design as in claim 30, wherein said first bead is formed along a first outer boundary, wherein said bead has a bead width, wherein said offset distance from said design outer perimeter and said first outer boundary is about equal to half of said bead width.

32. A part made according to a design as in claim 30, wherein said first bead is formed along a first outer boundary, wherein said bead has a bead width, wherein said offset distance from said design outer perimeter and said first outer boundary is less than about half of said bead width.

33. A part made according to a design as in claim 30, wherein said first bead is formed along a first outer boundary, further comprising the step of forming a second bead along a second outer boundary, said second outer boundary being offset at a second offset distance inward from said first outer boundary.

34. A part made according to a design as in claim 33, wherein said second offset distance from said design outer perimeter is about equal to twice said bead width.

35. A part made according to a design as in claim 30, wherein said first bead is formed along a first outer boundary, further comprising the step of forming a filling said layer between said bead first and second legs, wherein said filling is performed within a second outer boundary, said second outer boundary being offset at a second offset distance inward from said first outer boundary.

36. A part made according to a design as in claim 35, wherein said filling is performed with a second bead formed at acute angles to said first bead, said second bead formed along a second bead center line, wherein said second bead center line does not comes closer than said second outer boundary to said first bead, wherein said second offset distance is about equal to said bead width.

37. A method for generating at least one tool path within a layer region for layered manufacturing, wherein said layer region has at least a first perimeter and a second perimeter, wherein said layer region has a material portion between said first and second perimeters, wherein said tool path has an associated offset corresponding to about half of an associated tool path bead width, wherein said two perimeters define a narrow region therebetween, wherein said two perimeters are separated at a distance of less than about double said tool path offset, the method comprising the steps of:

obtaining a relative preservation weighting for preserving each of said two perimeters in said narrow region; and generating a tool path between said perimeters in said narrow region as a function of said relative preservation weightings.

38. A method for generating at least one tool path as in claim 37, wherein said obtaining step includes obtaining a substantially equal preservation weighting for said first and second perimeters, and said tool path generating step includes generating a tool path through said narrow region about equidistant from said first and second perimeters.

39. A method for generating at least one tool path as in claim 37, wherein said generating tool path step includes performing a medial axis transformation.

40. A method for generating at least one tool path as in claim 37, wherein said obtaining step includes obtaining a substantially greater preservation weighting for said first perimeter relative to said second perimeter, and said tool path generating step includes generating a tool path through said narrow region disposed further from said first perimeter than from said second perimeter.

41. A method for generating at least one tool path as in claim 37, wherein said obtaining step includes obtaining a substantially greater preservation weighting for said first perimeter relative to said second perimeter, and said tool path generating step includes generating a tool path through said narrow region disposed further from said first perimeter than from said second perimeter.

42. A method for generating at least one tool path as in claim 37, wherein said obtaining step includes obtaining a substantially one hundred percent (100%) preservation weighting for said first perimeter and substantially zero percent (0%) preservation weighting for said second perimeter, and said tool path generating step includes generating a tool path through said narrow region at closest about one offset distance from said first perimeter.

43. A method for generating at least one tool path as in claim 37, wherein said first and second perimeters are both inner perimeters corresponding to inner voids, wherein said obtaining step includes obtaining a substantially equal preservation weighting for said first and second perimeters, and said tool path generating step includes generating a tool path through said narrow region about equidistant from said inner voids.

44. A method for generating at least one tool path as in claim 37, wherein said first and second perimeters are both inner perimeters corresponding to inner voids, wherein said obtaining step includes obtaining a substantially equal preservation weighting for said first and second perimeters, and said tool path generating step includes generating a tool path through said narrow region including performing a medial axis transformation.

45. A method for generating at least one tool path as in claim 37, wherein said first and second perimeters are both outer perimeters corresponding to outer surfaces, wherein said obtaining step includes obtaining a substantially equal preservation weighting for said first and second perimeters, and said tool path generating step includes generating a tool path through said narrow region about equidistant from said outer surfaces.

46. A method for generating at least one tool path as in claim 37, wherein said first and second perimeters are both outer perimeters corresponding to outer surfaces, wherein said obtaining step includes obtaining a substantially equal preservation weighting for said first and second perimeters, and said tool path generating step includes generating a tool path through said narrow region including performing a medial axis transformation.

47. A method for generating at least one tool path as in claim 37, wherein said first perimeter is an inner perimeter corresponding to an inner void, wherein said second perimeter is an outer perimeter corresponding to an outer surface, wherein said obtaining step includes obtaining a substantially greater preservation weighting for said first perimeter relative to said second perimeter, and said tool path generating step includes generating a tool path through said narrow region further from said first perimeter and closer to said second perimeter, such that said inner void is preserved more than said outer surface near said inner void.

48. A method for generating at least one tool path as in claim 37, wherein said first perimeter is an inner perimeter corresponding to an inner void, wherein said second perimeter is an outer perimeter corresponding to an outer surface, wherein said obtaining step includes obtaining a substantially greater preservation weighting for said second perimeter relative to said first perimeter, and said tool path generating step includes generating a tool path through said narrow region further from said second perimeter and closer to said first perimeter, such that said outer surface is preserved more than said void near said outer surface.

49. A method for generating at least one tool path within a design layer region for layered manufacturing, wherein said design layer region has an inner void, wherein said design layer region has an outer perimeter and at least one inner perimeter associated with said inner void, wherein said design layer region has a material region between said outer perimeter and said inner perimeter, wherein said tool path has an associated offset corresponding to about half of an associated tool path bead width, wherein said tool path has an origin, the method comprising the steps (a) establishing an inner perimeter boundary disposed at about said offset distance from said inner void perimeter toward said material region, such that a first margin is established about said inner void within said material region;

(b) generating said tool path along a line until said line intersects said inner perimeter boundary at an intersection point;

(c) if said intersection point is the first intersection of said tool path with said inner perimeter boundary, executing step (d), otherwise executing step (e);

(d) continuing said tool path in a direction following said inner perimeter boundary in a direction such that said tool path initially proceeds most toward said tool path origin; and (e) continuing said tool path in a direction following said inner perimeter boundary in a direction such that said tool path initially proceeds most away from said tool path origin.

50. A method for generating at least one tool path within a design layer region for layered manufacturing, wherein said design layer region has an inner void, wherein said design layer region has an outer perimeter and at least one inner perimeter associated with said inner void, wherein said design layer region has a material region between said outer perimeter and said inner perimeter, wherein said tool path has an associated offset corresponding to about half of an associated tool path bead width, wherein said tool path has an origin, the method comprising generating said tool path along a plurality of line segments which do not approach said void inner perimeter closer than about said offset distance, and which follow said inner perimeter at about said offset on opposite sides of said inner void perimeter.

51. A method for generating at least one tool path within a design layer region for layered manufacturing, wherein said design layer region has an inner void, wherein said design layer region has an outer perimeter and at least one inner perimeter associated with said inner void, wherein said design layer region has a material portion between said outer perimeter and said inner perimeter, wherein said tool path has an associated offset corresponding to about half of an associated tool path bead width, wherein said tool path has an origin, the method comprising the steps of:

(a) establishing a first axis in said design layer relative to said outer perimeter, thereby establishing a second axis orthogonal to said first axis;

(b) generating an outer perimeter boundary into said material region, having a distance from said outer perimeter of about said offset distance;

(c) generating an inner perimeter boundary into said material region, having a distance from said inner perimeter of about said offset distance;

(d) generating a plurality of parallel guides parallel to said first axis;

(e) establishing a tool path origin point, and initializing said tool path generation at said origin point parallel to said first axis;

(f) continuing generating said tool path line until said tool path intersects a line selected from the group of outer perimeter boundaries, inner perimeter boundaries, and guide lines; then, executing step (g);

(g) if said step (f) tool path intersection is an outer perimeter boundary intersection, then generating said tool path to follow said outer perimeter boundary in a direction initially most away from said origin, then executing step (f);

(h) if said step (f) tool path intersection is an inner perimeter boundary intersection, and if said step (f) intersection is the first intersection with said inner perimeter boundary, then generating said tool path to follow said inner perimeter boundary in a direction initially most toward said origin, then executing step (f);

(i) if said tool path intersection is an inner perimeter boundary intersection, and if said intersection is not the first intersection with said inner perimeter boundary, then generating said tool path to follow said inner perimeter boundary in a direction initially most away from said origin, then executing step (f);

(j) if said step (f) tool path intersection is a guide line intersection, then generating said tool path along said guide line in a direction most initially toward said origin, then executing step (f); and (k) repeating steps (f) through (j) until no more contiguous travel of unvisited guide lines is possible.

52. A method for generating at least one tool path as in claim 51, wherein said design layer region has a vertex, wherein said establishing tool path origin step includes establishing said tool path origin to a point near said vertex.

53. A method for generating at least one tool path as in claim 51, wherein said establishing tool path origin step includes initializing said tool path origin to a point near a vertex defined by: selecting two outer perimeter lines, offsetting each outer perimeter line inward to define an outer perimeter boundary line, and determining a point location where said two outer perimeter boundary lines intersect in said material region, and setting said origin to about said point location.

54. A method for generating at least one tool path as in claim 51, wherein said outer perimeter includes a vertex defined by two outer perimeter lines meeting at an angle, wherein said establishing tool path origin step includes determining a point location bisecting said angle at a distance of about one offset from said vertex, and setting said origin to about said point location.

55. A method for generating at least one tool path as in claim 51, wherein said design layer has at least one outer contour tool path, and said outer perimeter is established at an offset distance inward from said outer contour tool path.

56. A method for generating at least one tool path as in claim 51, wherein said guide lines are virtual guide lines.

57. A method for generating tool paths for a layer for layered manufacturing comprising the steps of:

obtaining an outer boundary for said layer;

forming a plurality of substantially parallel raster tool path pairs, said pairs having a first segment coupled at a first raster vertex to a second segment, said second segment coupled at a second vertex to a third segment, wherein said second segment is substantially parallel to said outer boundary, wherein said first and second segments are substantially parallel to each other and to said raster tool path pairs;

wherein said raster tool path pairs are separated by inter-pair lines disposed between a first segment of a first raster pair and a third segment of a second, adjacent raster pair;

wherein an inter-pair intersection point is formed by a projection extension of said inter-pair line to said outer boundary; and positioning first and second raster vertices disposed on either side of said intra-pair line at about one half of said raster tool path bead width from said inter-pair intersection point.

58. A method for generating tool paths as in claim 57, further comprising projecting said first and third raster segments to form first and second raster intersection points with said outer boundary, further comprising determining if said outer boundary has any first vertices in between said first raster intersection point and inter-pair intersection point, and using said any first vertices in said positioning first raster vertices, further comprising determining if said outer boundary have any second vertices in between said second raster intersection point and inter-pair intersection point, and using said any second vertices in said positioning second raster vertex.

59. A method for generating tool paths as in claim 58, wherein said any first vertices are averaged with said first raster intersection point to form a first average point used to position said first raster vertex, wherein said any second vertices are averaged with said second raster intersection point to form a second average point used to position said second raster vertex.

60. A method for generating tool paths as in claim 57, wherein said outer boundary is an inward offset perimeter of said layer having a contour bead.

61. A part made by a layered manufacturing process comprising forming an outer contour bead and inner raster beads disposed at an angle to said contour bead such that no voids exist between said raster beads and said contour beads.

62. An automatic method for making a part by a layered manufacturing process comprising forming material raster beads at an angle to an outer contour bead such that no voids exist between said raster beads and said contour beads.

63. An automatic method as in claim 62, wherein said forming step includes forming raster bead turnaround portions having vertices, wherein said raster bead turnaround vertices are located as a function at least in part of said angle.

* * * * *